(12) United States Patent
McCormack et al.

(10) Patent No.: US 7,502,511 B2
(45) Date of Patent: *Mar. 10, 2009

(54) SHAPE GRAMMAR INTERPRETER

(75) Inventors: Jay P. McCormack, Moscow, ID (US); Jonathan Cagan, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/897,180

(22) Filed: Aug. 29, 2007

(65) Prior Publication Data

US 2007/0297680 A1 Dec. 27, 2007

Related U.S. Application Data

(63) Continuation of application No. 10/350,428, filed on Jan. 24, 2003, now Pat. No. 7,415,156, which is a continuation-in-part of application No. 09/493,903, filed on Jan. 28, 2000, now Pat. No. 7,050,051.

(51) Int. Cl.
G06K 9/46 (2006.01)
G06T 15/00 (2006.01)

(52) U.S. Cl. .................. 382/203; 345/419
(58) Field of Classification Search ............ 382/203; 345/419–427

See application file for complete search history.

(56) References Cited

U.S. PATENT DOCUMENTS

| | | | |
|---|---|---|---|
| 4,388,610 A | 6/1983 | Tsunekawa | |
| 4,771,469 A | 9/1988 | Wittenburg | |
| 5,133,052 A | 7/1992 | Bier et al. | |
| 5,280,530 A | 1/1994 | Trew et al. | |
| 5,325,475 A | 6/1994 | Poggio et al. | |

(Continued)

OTHER PUBLICATIONS

Agarwal et al. " A blend of different tastes: the language of coffeemakers," Environment and Planning B: Planning and Design, 1998, vol. 25, pp. 205-226.

(Continued)

Primary Examiner—Aaron W Carter
(74) Attorney, Agent, or Firm—Jones Day; Edward L. Pencoske

(57) ABSTRACT

Parametric shape recognition is achieved through a decomposition of shapes into a hierarchy of subshapes ordered by their decreasing restrictions. Instances of each of the subshapes are individually located in the design shape and then reconstructed to form an instance of the entire shape. The basis for the hierarchy of subshapes can be specified by the designer or based on the default parameter relations that come from architectural and engineering knowledge. The levels of the hierarchy are defined so that the most constrained lines of a shape are those lines that the designer intended exactly. These most constrained lines have specified parametric relations to other line segments and those relations, if altered, will compromise the designer's intentions. Conversely, the lowest level of the hierarchy, which contains the least constrained line segments, only implies a specific connectivity between line segments, necessitating a vaster search. The parametric recognition of curved line shapes uses a two-step approach that first performs shape matching with an equivalent straight-line shape then checks those transformations for matching with the actual curved lines. This approach has advantages over just matching characteristic polygons in that it can match equivalent curves with differing characteristic polygons as well as emergent shapes.

21 Claims, 24 Drawing Sheets

U.S. PATENT DOCUMENTS

| | | | |
|---|---|---|---|
| 5,351,310 | A | 9/1994 | Califano et al. |
| 5,590,261 | A | 12/1996 | Sclaroff et al. |
| 5,636,297 | A | 6/1997 | Eller et al. |
| 5,801,711 | A | 9/1998 | Koss et al. |
| 5,870,106 | A | 2/1999 | Langelaan |
| 5,926,568 | A | 7/1999 | Chaney et al. |
| 5,929,865 | A | 7/1999 | Balz et al. |
| 5,963,668 | A | 10/1999 | Horikawa et al. |
| 5,999,944 | A | 12/1999 | Lipkin |
| 6,118,897 | A | 9/2000 | Kohno |
| 6,191,787 | B1 | 2/2001 | Lu et al. |
| 6,219,056 | B1 | 4/2001 | Felser et al. |
| 6,292,197 | B1 | 9/2001 | Langelaan |
| 6,356,272 | B1 | 3/2002 | Matsumoto et al. |
| 6,396,952 | B1 | 5/2002 | Horikawa et al. |
| 6,512,519 | B1 | 1/2003 | Arsenault et al. |
| 6,532,304 | B1 | 3/2003 | Liu et al. |
| 7,050,051 | B1 | 5/2006 | McCormack et al. |

OTHER PUBLICATIONS

Agarwal et al., "A Micro Language: Generating MEMS Resonators using a Coupled Form-Function Shape Grammar," Accepted, Environment and Planning B: Planning and Desion. 1999.

Chiou et al,, "The grammar of Taiwanese traditional vernacular dwellings," Environment and Planning B: Planning and Design 1995, vol. 22, pp. 689-720.

Hanson et al., On Modelling the Work of the Architect Glenn Murcutt, Design Computing, vol. 1, pp. 189 203 (1986).

Chiou et al., "The grammatical basis of Chinese traditional architecture", Languages of design, Formalisms for Word, Image and Sound, 1995, pp. 5-31.

Knight, The generation of Hepplewhite-style chair-back designs, Environment and Planning B. 1980, vol. 7, pp. 227-238.

Stiny, "Kindergarten grammars: designing with Froebel's building gifts", Environment and Planning B. 1980, vol. 7, pp. 409-462.

Flemming, "The Role of Shape Grammars in the Analysis and Creation of Designs," chap. 12, pp. 245-272, Computability of Design, Kalay, ed., 1987.

Cagan et al., "Optimally directed shape generation by shape annealing", Environment and Planning B: Planning and Design, 1993, vol. 20, pp. 5-12.

Chien, Sheng-Fen, et al., "SG-Clips: A System to Support the Automatic Generation of Designs from Grammars", Proc. CAADRIA '98, Third Conference on Computer Aided Architectural Design Research in Asia Apr. 22-24, 1998, pp. 445-454.

Krishnamurti et al., "Spatial Grammars: Motivation, Comparison, and New Results", CAAD Futures '93, U. Flemming and S. VanWyk (Editors), 1993, Elsevier Science Publishers B.V., pp. 57-74.

Krishnamurti, R., "The maximal representation of a shape", Environment and Planning B: Planning and Design, 1992, vol. 19, pp. 267-288.

Krishnamurti, R., et al., "Shape recognition in three dimensions", Environment and Planning B: Planning and Design, 1992, vol. 19, pp. 585-603.

Krishnamurti, R., et al. "Spatial change: continuity, reversibility, and emergent shapes", Environment and Planning B: Planning and Design, 1997, vol. 24, pp. 359-384.

Krishnamurti, R., "The arithmetic of maximal planes", Environment and Planning B: Planning and Design, 1992, vol. 19, pp. 431-464.

Gips, J., et al., "Production systems and grammars: a uniform characterization", Environment and Planning B: 1980, vol. 7, pp. 399-408.

Stiny, George, "The Algebras of Design", Research in Engineering Design, 1991, pp. 171-181.

Stiny, George, "Weights", Environment and Planning B: Planning and Design, 1992, vol. 19, pp. 413-430.

Brown, Ken, "Grammatical Design", IEEE Expert, Mar.-Apr. 1997, pp. 27-33.

Stiny, G., "Introduction to shape and shape grammars", Environment and Planning B. 1980, vol. 7, pp. 343-351.

Krishnaumrti, R., "The construction of shapes", Environment and Planning B, 1981, vol. 8, pp. 5-40.

Krishnamurti, R., "The arithmetic of shapes", Environment and Planning B, 1980 vol. 7, pp. 463-484.

Krishnamurti et al., "Shape recognition in three dimensions", Environment and Planning B: Planning and Design, 1992 vol. 19 pp. 585-603.

Shea et al., "Innovative dome design: Applying geodesic patterns with shape annealing", Artificial Intelligence for Engineering Design, Analysis and Manufacturing (1997), 11, pp. 379-394.

Piazzalunga et al., "Note on a three-dimensional shape grammar interpreter", Environment and Planning B: Planning and Design, 1998, vol. 25, pp. 11-30.

Chase, "Shapes and shape grammars: from mathematical model to computer implementation", Environment and Planning B: Planning and Design, 1989, vol. 16, pp. 215-242.

Stiny, G., "Ice-ray: a note on the generation of Chinese lattice designs", Environment and Planning B: 1977, vol. 4, pp. 89-98.

Stiny, G., "The Palladian grammar", Environment and Planning B: 1978, vol. 5, pp. 5-18.

Stiny, G., et al., "The grammar of paradise: on the generation of Mughul gardens", Environment and Planning B: 1980, vol. 7, pp. 209-226.

Koning, H., et al., "The language of the prairie: Frank Lloyd Wright's prairie houses", Environment and Planning B, 1981, vol. 8, pp. 295-323.

Agarwal, M., et al., "A blend of different tastes: the language of coffeemakers", Environment and Planning B: Planning and Design, 1997, vol. 24, pp. 1-22.

Tapia, M., "A visual implementation of a shape grammar system", Environment and Planning B: Planning and Design 1999, vol. 26, pp. 59-73.

Mitchell, "Functional Grammars: an introduction", Reality and Virtual Reality, 1991, pp. 167-176.

Cagan, "Engineering Shape Grammars: Where are we and where are we going?", NSF Workshop on Shape Computation at MIT, Apr. 25 and 26, 1999, pp. 1-30.

Stiny, "Two exercises in formal composition, "Environment and Planning B, 1976, vol. 3, pp. 187-210.

Stouffs et al., "Constructing the boundary of a shape," 1997, pp. 1-26.

Stouffs et al., "The boundary of a shape," 1997, pp. 1-28.

Stouffs et al., "Classifying the boundary of a shape," 1997, pp. 1-24.

Stouffs et al., "A note on the computational complexity of dealing with the boundary of a shape," 1997, pp. 1-10.

Gips, "Computer Implementation of Shape Grammars," NSF Workshop on Shape Computation at MIT, Apr. 25 and 26, 1999, pp. 1-11.

Chiou et al., "Unraveling feng-shul," Environment and Planning B: Planning and Design, 1997, vol. 24, pp. 549-572.

Chiou et al., "The fortunate dimensions of Taiwanese traditional architecture," Environment and Planning B: Planning and Design, 1995, vol. 22, pp. 547-562.

Chiou et al., "Example Taiwanese traditional houses," Environment and Planning B: Planning and Design, 1996, vol. 23, pp. 191-216.

Ozcan et al. "Shape Recognition Using Genetic Algorithms", May 1996, Proceedings of IEEE International Conference on Evolutionary Computation, 1996, pp. 411-416.

$C_1$ $S_1+S_2$

Shape a          Shape b $c_0$

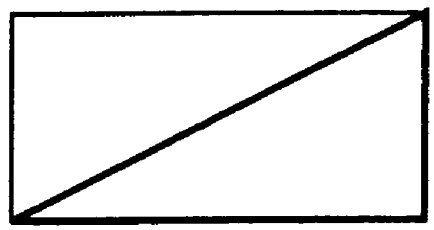
*Fig.26a* — Initial Shape
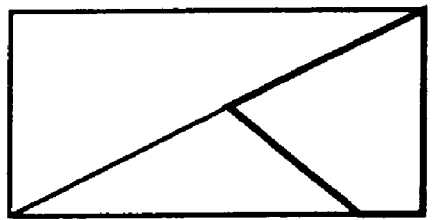
*Fig.26b* — Apply Rule 1
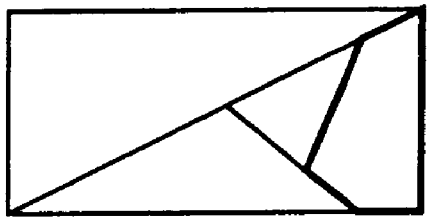
*Fig.26c* — Apply Rule 3
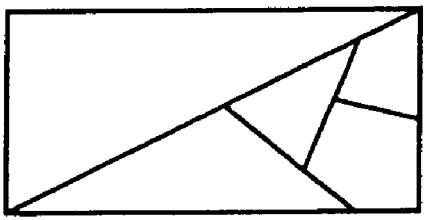
*Fig.26d* — Apply Rule 4
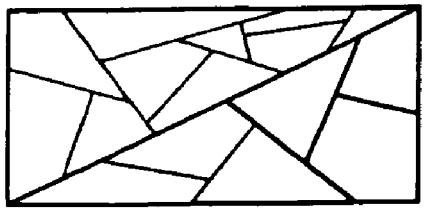 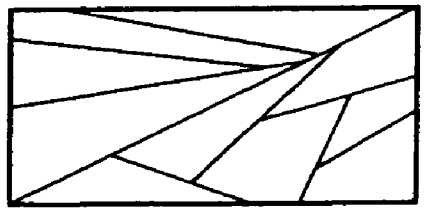
*Fig.27*

Shape a          Shape c₀

Shape $c_0$  Shape $v_0$

Matching shapes that result from the search for $d_1$ in $v_0$

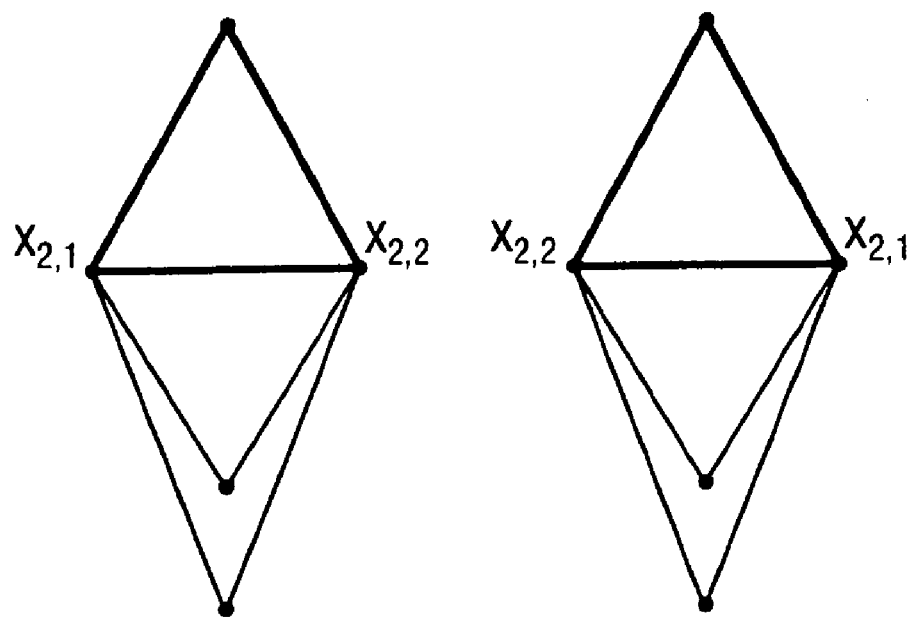
Set of shapes F₁
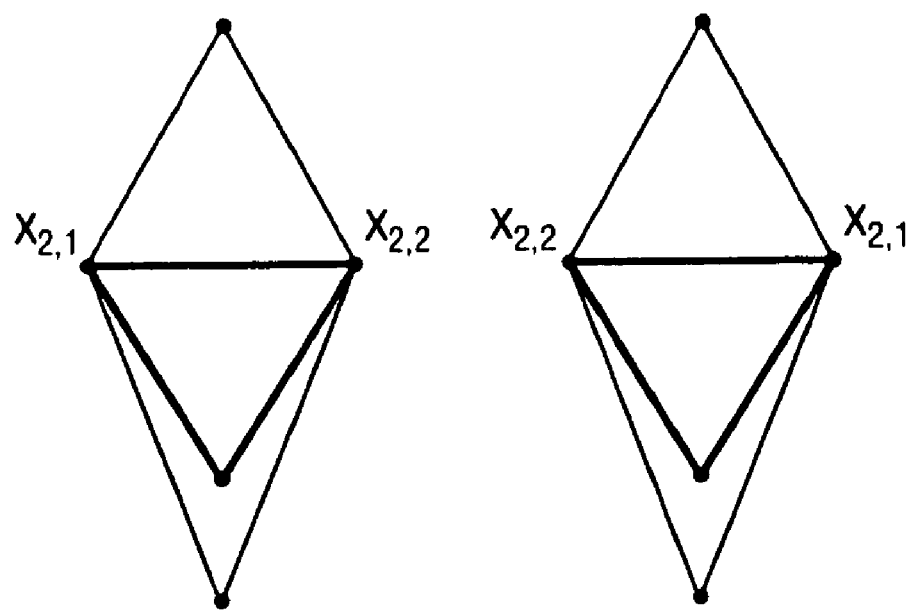
*Fig.35*

Set of shapes $S_1$

Set of shapes $V_2$

Distinct shape matches of d in $V_0$

Instances of shape a in shape $C_0$

SHAPE GRAMMAR INTERPRETER

CROSS-REFERENCE TO RELATED APPLICATIONS

This application is a continuation of U.S. patent application Ser. No. 10/350,428 entitled Parametric Shape Grammar Interpreter filed Jan. 24, 2003, now U.S. Pat. No. 7,415,156, which is a continuation-in-part of U.S. patent application Ser. No. 09/493,903 entitled Parametric Shape Grammar Interpreter filed Jan. 28, 2000, now U.S. Pat. No. 7,050,051.

STATEMENT REGARDING FEDERALLY SPONSORED RESEARCH OR DEVELOPMENT

Certain of the research leading to the present invention was sponsored by the United States National Science Foundation under Contract No. DMI-9713782. The United States Government may have rights in the invention.

BACKGROUND OF INVENTION

1. Field of Invention

The present invention relates generally to shape grammars and, more particularly, to shape grammar systems and methods having parametric shape recognition.

2. Description of the Background

A shape grammar provides a formal method for the construction of shapes. Knowledge is encoded within a grammar in the shapes that define its rules. Synthesizing designs in the language defined by the grammar is a matter of applying rules beginning with an initial shape and finishing with a terminating rule.

Shape grammars originated in the architectural field from work done by Stiny and Gips (1972, Shape Grammars and the Generative Specification of Painting and Sculpture. *Information Processing* 71, IFIP, North-Holland, Amsterdam) where they were used to capture the style of Queen Anne houses (Flemming, U. 1987. The Role of Shape Grammars in the Analysis and Creation of Designs. Kalay Y. E. (ed.), *Computability of Designs* (New York: John Wiley), pp. 245-272.) and articulate the rules of Frank Lloyd Wright's prairie house (Koning, H. and Eizenberg, J. 1981. The Language of the Prairie: Frank Lloyd Wright's Prairie Houses. *Environment and Planning B: Planning and Design,* 8:295-323), among other applications. Shape grammars can be classified as a production system (Stiny and Gips, Production Systems and Grammars in a Uniform Characterization, *Environment and Planning B,* 7:399-408 (1980)) containing all of the necessary parts, objects, system definition, and an interpretive mechanism. A shape grammar is a set of rules, based on shape, that is used to generate designs through rule applications. Rules take the form of a→b, where a and b both denote shapes. A rule is applicable if the left-hand shape, a, can be found in the design shape, denoted c. If the rule is applied, the left hand shape is subtracted from the design and the right-hand shape is added to the design, denoted c−τ(a)+τ(b), where shapes a and b undergo a transformation τ according to the transformation required to make shape a a subshape of shape c.

Shape grammars, having their roots in architecture literature, have recently found application in engineering, such as in the design of coffeemakers, lathe process plans, roof trusses, and microelectromechanical systems (MEMS) resonators. Shape grammars may be conceptualized of as a type of expert system based on geometry. Shape grammars, however, have succeeded in engineering applications where traditional expert systems have failed because of: (i) their direct handing of reasoning about geometry; (ii) their ability to operate on a parametric geometric representation; and (iii) their ability to support emergence of shape. These advantages presage a future in which shape grammars play an increasingly larger role in engineering design in comparison with the traditional expert systems.

Representation of products with a shape grammar is limited by the technology available to implement the grammar. A shape grammar interpreter must provide the means to add, subtract, and perform subshape matching in order to implement a grammar. A system that can perform addition, subtraction, and recognition operations on shapes as well as interface with a human user or automated function is called an interpreter. Interpreters can implement any shape grammar whose shapes are limited to the restrictions implied by the shape operations. Shape grammar interpreters provide a quick method to move a shape grammar from paper to an implemented design synthesis tool. Krishnamurti, The Arithmetic of Shapes, *Environment and Planning B. Planning and Design* 7:463-484 (1980) described a method for non-parametric subshape recognition of lines in two and three dimensions as well as shape addition and subtraction.

In the past, however, shape grammars have been limited by the difficulty and time intensity in their implementations. Implementations have not allowed for general parametric shape recognition. Engineering shape grammars in particular have been restricted to limited, non-parametric shape recognition and often are hard-coded. These drawbacks minimize much of the beneficial potential of shape grammars.

Accordingly, there exists a need for a shape grammar system that uses shape recognition to provide, for example, an automated approach to product generation. There further exists a need for a shape grammar system in which engineering knowledge (geometry-based and otherwise) may be incorporated into implementation design rules in order to drive design exploration and the generation of designs toward a desired end.

BRIEF SUMMARY OF INVENTION

In the present invention, parametric shape recognition is achieved through a decomposition of shapes into a hierarchy of subshapes ordered by their decreasing restrictions. Instances of each of the subshapes are individually located in the design or target shape and then reconstructed to form an instance of the entire shape. The basis for the hierarchy of subshapes can be specified by the designer or based on the default parameter relations that come from architectural and engineering knowledge. The levels of the hierarchy are defined so that the most constrained lines of a shape are those lines that the designer intended exactly. These most constrained lines have specified parametric relations to other line segments and those relations, if altered, will compromise the designer's intentions. Conversely, the lowest level of the hierarchy, which contains the least constrained line segments, only implies a specific connectivity between line segments, necessitating a vaster search.

An extension can be made to the hierarchical method of parametric shape recognition that can be used for parametric recognition of curved line shapes. This extension uses a two-step approach that first performs shape matching with an equivalent straight-line (distinct) shape and then checks those transformations of the distinct shape for matching with the actual curved lines. This approach has advantages over just matching characteristic polygons in that it can match equivalent curves with differing characteristic polygons as well as emergent shapes.

The present invention allows for shape grammars, including engineering shape grammars, to be implemented in a fraction of the time that it currently takes to hard code them. Consequently, the present invention allows shape grammars to be adjusted, fine tuned, and adapted to the changing design scenario presented to the rule writer. The shape grammar interpreter of the present invention therefore possesses the features desired in an engineering grammar implementation, including general parametric shape recognition, providing designers with the possibility of exploring the promising potential of engineering shape grammar systems. These and other benefits of the present invention will be apparent from the detailed description hereinbelow.

DESCRIPTION OF THE FIGURES

For the present invention to be clearly understood and readily practiced, the present invention will be described in conjunction with the following figures, wherein:

FIGS. 24-27 are diagrams illustrating a method of using parametric shape recognition to apply a set of shape grammar rules to a given initial design shape according to another embodiment of the present invention.

FIG. 35 illustrates matches which are stored in the set of shapes $F_1$.

DETAILED DESCRIPTION OF THE INVENTION

Figure 1:
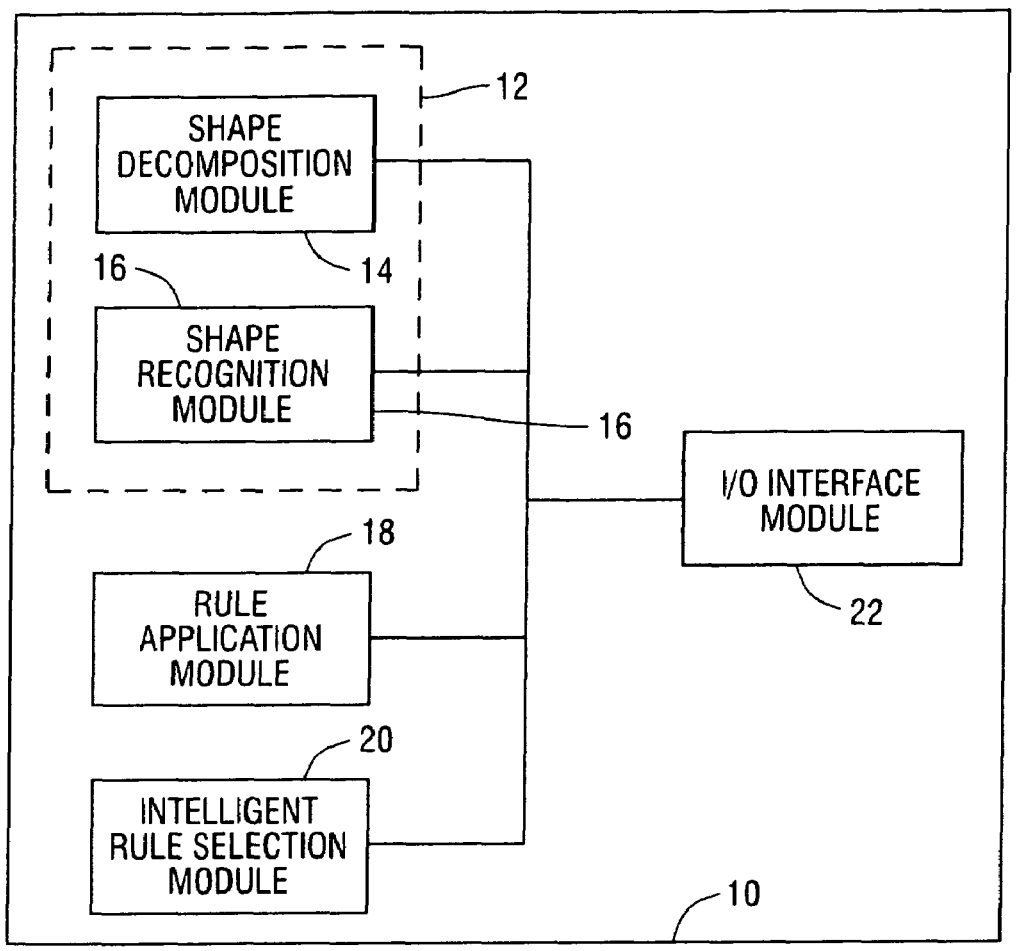
FIG. 1 is a block diagram of a shape grammar system according to one embodiment of the present invention.

FIG. 1 is a block diagram of a shape grammar system 10 according to one embodiment of the present invention. The shape grammar system 10 includes a parametric shape grammar interpreter 12, including a shape decomposition module 14 and a shape recognition module 16. The shape grammar system 10 also includes a rule application module 18 and an intelligent rule selection module 20, which are in communication with the parametric shape grammar interpreter 12. The shape grammar system 10 may also include an input/output (I/O) interface module 22, as illustrated in FIG. 1. The shape grammar system 10, as described hereinbelow, may be used to implement, for example, architectural shape grammars, engineering shape grammars, and industrial design shape grammars, with parametric shape recognition. The parametric shape grammar interpreter 12 will be described herein as being used to recognize the left-hand shape of a shape grammar rule in the initial design shape(s) through the steps of decomposing the shape into subshapes and progressively searching for parametric transformations of those subshapes, however, it should be recognized that the benefits of the present invention may be realized in any application requiring parametric shape recognition, and is not limited to shape grammar applications.

The system 10 may be implemented using, for example, a computer, such as a workstation or a personal computer, a microprocessor, or an application specific integrated circuit (ASIC). The modules 14, 16, 18, 20, and 22 may be implemented as software code to be executed by the system 10 using any type of computer instruction type suitable such as, for example, microcode, and can be stored in, for example, an electrically erasable programmable read only memory (EEPROM), or can be configured into the logic of the system 10. According to another embodiment, the modules 14, 16, 18, 20, and 22 may be implemented as software code to be executed by the system 10 using any suitable computer language such as, for example, C or C++ using, for example, conventional or object-oriented techniques. The software code may be stored as a series of instructions or commands on a computer readable medium, such as a random access memory (RAM), a read only memory (ROM), a magnetic medium such as a hard-drive or a floppy disk, or an optical medium such as a CD-ROM.

The parametric shape grammar interpreter 12 may perform the operations necessary to determine whether any of a predefined set of shape grammar rules may be applied to a particular shape (or set of shapes). In addition, the interpreter 12 may determine how a particular rule may be applied to the shape(s). As described hereinbelow, the interpreter 12 may perform these operations by decomposing, for example, the left-hand shape of a shape grammar rule into a group of subshapes, thereby allowing for any part of the shape to be transformed with any possible transformation, although, as discussed hereinbefore, it is not limited to such shapes. The interpreter 12 may perform these operations with respect to, for example, a left-hand shape of a rule having one-dimensional, two-dimensional or three-dimensional shapes. In addition, the left-hand shape may include, for example, straight line segments, curved line segments, planes, or three-dimensional objects. Once the interpreter 12 determines whether a rule may be applied and how to apply the rule, whether the rule should be applied to the shape may be determined, for example, by a user of the system 10 or the intelligent rule selection module 20. The rule application module 18 may then apply the rule to the shape if so determined.

The shape decomposition module 14 decomposes a shape such as, for example, the left-hand shape of a rule (the shape a in the rule a→b) into a group of subshapes contained in the shape. The groups may be defined such that subshapes belonging to different groups do not share, for example, line segments for two-dimensional shapes. The group of shapes may be ordered according to a hierarchy of, for example, decreasing restrictions or constraints for more efficient searching, as described hereinbelow, although it is not necessary for the subshape groups to be so ordered.

For an embodiment in which the subshape groups are ordered according to a hierarchy of decreasing constraints, the basis of the hierarchy of constraints may be, for example, defined by the designer or it may be a default hierarchy. A default hierarchy may be designed, for example, to interpret the designer's intentions and preferences through particular features present in a shape which defines part of a shape grammar rule. For example, the default hierarchy may be intended to separate the parts of the left-hand shape of the rule that the designer specified exactly from the parts of the shape that were intended as a general scheme.

For example, in defining a default hierarchy for an embodiment in which the left-hand shapes of the predefined shape grammar rules include shapes having straight lines in a single plane, it is recognized that there is a limited set of transformations that can be applied to the shapes, such as translation, rotation, scaling (isotropic and anisotropic), and shearing. Of the possible transformations, some will destroy certain features of the shape and some will not. For example, no amount of translation or rotation will destroy a specific feature such as, for example, a right angle, a square, or an equilateral triangle. Shearing, however, will eliminate perpendicular intersections and symmetry in a two-dimensional shape. In addition, anisotropic scaling will also destroy symmetry unless the scaling is along or perpendicular to the line of symmetry. Isotropic scaling, on the other hand, does not affect the symmetry of a shape.

In view of the properties of these transformations, an example of a default hierarchy of subshapes may be defined as follows:

TABLE 1

| Subshape Group | Features | Transformations |
|---|---|---|
| $s_1$ | 1) lines that intersect perpendicularly and are the same length<br>2) lines that are symmetric to more than one lines that are not parallel | translation, rotation, isotropic scaling |
| $s_2$ | 1) lines that intersect perpendicularly<br>2) lines that are symmetric to one line or<br>3) more than one lines that are parallel | translation, rotation, anisotropic scaling |
| $s_3$ | intersecting lines | translation, rotation, anisotropic scaling, shearing |
| $s_4$ | none | all |

According to such a default hierarchy, subshape group $s_1$ consists of the most constrained lines. Group $s_1$ contains the line segments that intersect perpendicularly and are the same length. Additionally, the $s_1$ group also contains any line segment that is symmetric to two or more other line segments which are not parallel. Two examples of lines that meet the symmetry criteria of group $s_1$ are the sides of a square and the legs of an equilateral triangle.

Group $s_2$ consists of the next most constrained lines, containing line segments that intersect perpendicularly. Any line segment that is symmetric to another line segment is also included in group $s_2$. Accordingly, group $s_1$ is a subset of group $s_2$. Some examples of $s_2$ lines that are not also in group $s_1$ include the sides of a rectangle and the two equal legs of an isosceles triangle.

Figure 2:
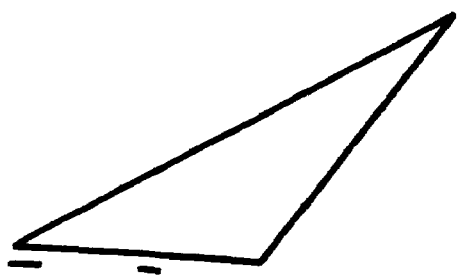
FIGS. 2 and 3 are diagrams of examples of line segments belonging to subshape groups according a default hierarchy of subshape groups according to one embodiment of the present invention.

Group $s_3$ contains the line segments that intersect. Thus, subshape groups $s_1$ and $s_2$ are subsets of $s_3$. An example of three lines that are in group $s_3$ and not $s_1$ or $s_2$ are the three line segments that make up the triangle illustrated in FIG. 2.

Figure 3:
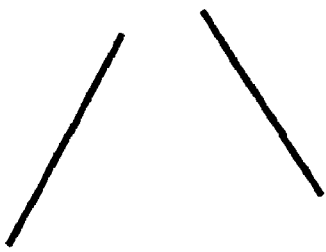

The line segments in group $s_4$ have no discernible spatial relationship to any other line segments. Thus, the line segments in group $s_4$ are essentially those not found in $s_1$, $s_2$, and $s_3$. An example of line segments that may be found in group $s_4$ are illustrated in FIG. 3.

The above-described default hierarchy is but one example of a hierarchy of subshapes ordered by decreasing constraints. According to other embodiments of the present invention, the shape decomposition module 14 may search the left-hand shape of a rule according to such other subshape hierarchies. Such other hierarchies, as described hereinbefore, may be defined by a user of the system 10, or may be a default hierarchy making different assumptions about the intent of the designer through particular features present in a shape which defines part of a shape grammar rule. For example, according to one embodiment, the hierarchy may be based on an assumption that the intersection of line segments at, for example, a right angle, is intended to represent a specific design choice, and the intersection of line segments at an angle other than a right angle is intended to represent a general scheme. According to other embodiments, the hierarchy may be based on an assumption that the intersection of line segments at, for example, sixty degrees, is intended to represent a specific design choice, and the intersection of line segments at an angle other than sixty degrees is intended to represent a general scheme.

The shape recognition module 16 searches a shape, or a set of shapes, for the subshapes belonging to the subshape groups according to the transformations appropriate for that group. According to one embodiment, parametric shape recognition may be accomplished by the shape recognition module 16 by repeating a three-step process for each of the subshape groups of the decomposed left-hand shape of a rule. The three steps of the process may include: 1) finding subshapes in the design shape, 2) subtracting the subshapes from the design shape, and 3) identifying the connectivity between the subshape and the design shape and between the subshapes of successive subshape groups by, for example, marking points of intersection with labels or weights to a) the overlapping points of the decomposed left-hand shapes and also to b) points in the design equal in location to the transformed, identified points in the decomposed left-hand side shape. The process is begun with a first of the subshape groups, and progressively repeated for the others. According to one embodiment, the subshape groups are of a hierarchical order of decreasing constraints, and the process is started with the most constrained group and progressively repeated with the next most constrained subshape group. Such an embodiment generally yields more efficient searching.

For example, according to such an embodiment, the initial design shape is first searched for subshapes belonging to the most constrained group. The subshape matches, found by applying the transformations appropriate for that group, are defined as a set S. The subshapes in the set S are each subtracted from the initial design shape, producing another set of shapes, denoted as the set C. According to one embodiment, the subshapes of a decomposed shape will overlap each other, if at all, only at points because the definition of the hierarchical groups may require that the subshapes share no line segments. Thus, in order to maintain the connectivity, and hence orientation, of the subshapes, the connectivity between the shapes of sets S and C is identified and maintained. The connectivity may be maintained, for example, by identifying with labels or weights the overlapping points of the decomposed left-hand shapes and the points in the initial design corresponding to the location of the transformed, identified points in the decomposed left-hand shape.

The shape recognition module 16 may repeat this process for all of the subshape groups. The shape recognition process may end when all of the decomposed parts of the left-hand shape have been found or when one of the shape searches finds no subshapes. The shape recognition module 16 may then add each of the shapes, maintaining the connectivity between the shapes, for each of the subshape groups found in the original shape to recognize the occurrences of the left-hand shape of the rule in the original design shape. Once the shape recognition process is completed, as described hereinbelow, the rule may then be applied.

Figure 4:
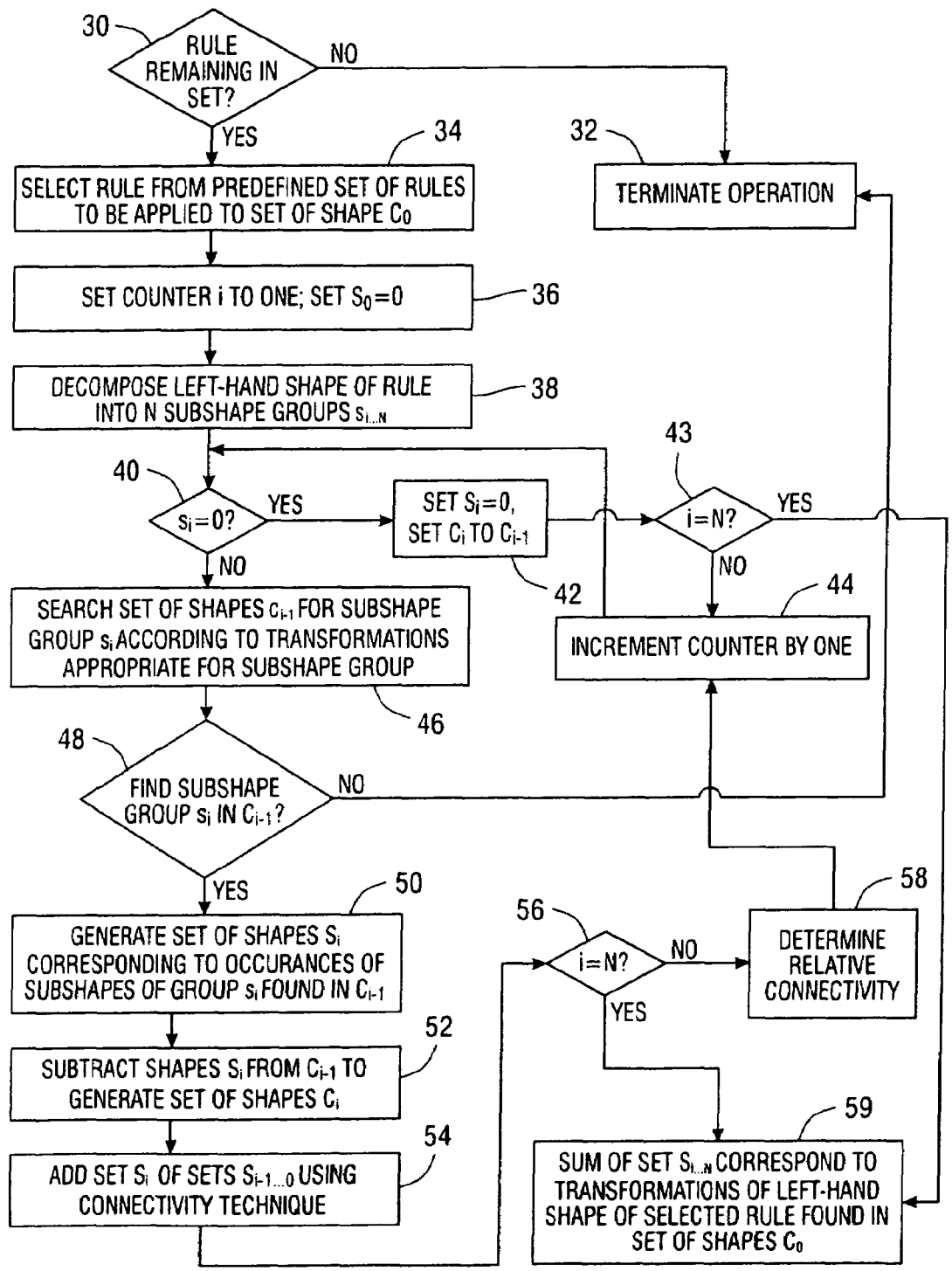
FIG. 4 is a block diagram of the process flow through the parametric shape grammar interpreter of the shape grammar system of FIG. 1 according to one embodiment of the present invention.
Figure 5:
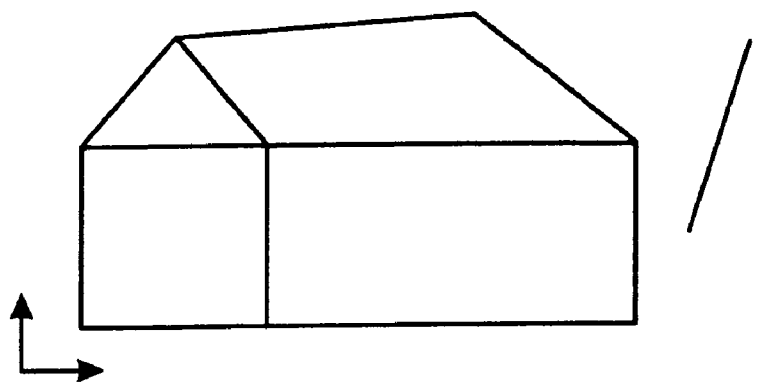
FIGS. 5-11 are diagrams illustrating a method of shape decomposition according to one embodiment of the present invention.

FIG. 4 is a block diagram of the process flow through the parametric shape grammar interpreter 12 according to one embodiment of the present invention. The process begins at block 30 with a determination of whether a rule remains in a set of shape grammar rules for which the left-hand shape of the rule has not been searched in the set of shapes $C_0$. The set of shape grammar rules may be defined and input to the system 10 by a user of the system 10 and may be, for example, architectural shape grammar rules, engineering shape grammar rules, or industrial design shape grammar rules. The set of rules may include one or a multitude of rules. In addition, the set of shapes $C_0$ may include one shape or a multitude of shapes. If the set does not contain any such rules, the process flow continues to block 32, and the operation of the shape grammar interpreter 12 is terminated.

Conversely, if the set does contain such a rule, the process flow continues to block 34, where the rule is selected to be applied, if applicable as determined by the parametric shape grammar interpreter 12, to the set of shapes $C_0$. From block 34, the process flow advances to block 36, where a counter, denoted as is, is set to a value of one. In addition, at block 36, the set of shapes $S_0$, as discussed hereinbelow, is set to null.

From block 36, the process advances to block 38, where the left-hand shape of the rule is decomposed into a number, denoted N, of subshape groups, denoted $S_{i\ldots N}$. The subshape groups may be defined such that no subshapes of the decomposed left-hand shape share, for example, the same line segment. According to one embodiment, the subshape groups $S_{i\ldots N}$ may be of a hierarchical order of decreasing constraints, such as the default hierarchy described hereinbefore with respect to Table 1, or the hierarchy may be defined by a user of the system 10. According to other embodiments, the subshape groups are not ordered according to a hierarchical order.

From block 38, the process continues to block 40, where it is determined whether the subshape group $s_i$ is null. This corresponds to a determination of whether the left-hand shape of the rule includes a subshape belonging to the $s_i$ subshape group. For example, where i=1, it is determined whether the left-hand rule includes a subshape of the $s_1$ group. If the group $s_i$ is null, the process advances to block 42, where the set of shapes $S_i$, as described further hereinbelow, is set to null. In addition, at block 42, the set of shapes $C_i$, as described hereinbelow, is set to the same as the set $C_{i-1}$.

From block 42, the process flow advances to block 43, where it is determined whether i=N. If i does not equal N, then the process flow continues to block 44, where the counter (i) is incremented by one, and the process flow returns to block 40 such that it may be determined whether the subshape group $s_{i+1}$ is null. Conversely, if it is determined that i equals N, then the process flow advances to block 59.

If at block 40 it is determined that the $s_i$ subshape group is not null, the process flow continues to block 46, where the set of shapes $C_{i-1}$ is searched for subshapes belonging to the subshape group $s_i$. For example, where i=1, the set of shapes $C_0$ is searched for subshapes belonging to the subshape group $s_1$. Accordingly, as the counter i is incremented during the process flow, as described hereinbelow, the set of shapes to be searched ($C_0\ldots N-1$) will be progressively searched for subshapes belonging to the other subshape groups until all the subshape groups are exhausted.

The set of shapes $C_{i-1}$ is searched for subshapes belonging to the group $s_i$ using the parametric transformations appropriate for that group. For example, for the default subshape group described hereinbefore with respect to Table 1 where i=1, the set of shapes $C_0$ is searched for subshapes of the group $s_1$ using translation, rotation, and isotropic scaling. Accordingly, where i=2, the set of shapes $C_1$ is searched for subshapes of the group $s_2$ using translation, rotation, and anisotropic scaling, and so on for the remaining subshape groups $s_3$ and $s_4$.

From block 46, the process continues to block 48, where it is determined whether a parametric transformation of a subshape belonging to the group $s_i$ is found in the set of shapes $C_{i-1}$. For example, where i=1, it is determined whether a parametric transformation of a subshape belonging to the group $s_1$ is found in the set of shapes $C_0$. If a subshape belonging to the group $s_i$ is not found in the set of shapes $C_{i-1}$, the process flow returns to block 32, where the operation of the parametric shape grammar interpreter 12 is terminated. The process flow is terminated at this point because a subshape belonging to the group $s_i$ is not found in the set of shape $C_{i-1}$, and if the subshape group $s_i$ is not null, then the left-hand shape of the selected rule cannot be found in the set of shapes $C_0$. Conversely, if at block 48 a parametric transformation of a subshape belonging to the group $s_i$ is found, then the process continues to block 50.

At block 50, a set of shapes $S_i$ is generated. The set of shapes $S_i$ includes the parametric transformations of the subshapes of the group $s_i$ found in the set of shapes $C_{i-1}$ using the transformations appropriate for that subshape group. For example, where i=1, a set of shapes $S_1$ is generated which includes the parametric transformations of the subshapes of the group $s_1$ found in the set of shapes $C_0$. For subshape groups that are null, the set $S_i$ is set to be a null, as described hereinbefore with respect to block 42.

Continuing to block 52, a set of shapes $C_i$ is generated which corresponds to the subtraction of the set of shapes $S_i$ from the set of shapes $C_{i-1}$. Thus, for example, where i=1, at block 52 the set of shapes $C_i$ is generated which corresponds to the subtraction of the set of shapes $S_1$ from the set of shapes $C_0$. For subshape groups that are null, the set $C_i$ is set to be the same as $C_{i-1}$, as described hereinbefore with respect to block 42.

From block 52, the process continues to block 54, where the set of shapes $S_i$ are added to the sum of sets $S_{i-1, \ldots, 0}$. The set of shapes $S_i$ is added to the previous sum such that the connectivity of the decomposed left-hand shapes is maintained using, for example, the connectivity technique described herein. Thus, for example, where i=1, the set of shapes $S_1$ is added to the set of shapes $S_0$, which was set to null as described hereinbefore with respect to block 36. Accordingly, the sum of the sets $S_1$ and $S_0$ will be the same as $S_1$. The set $S_1$ will also be null if the group $s_1$ is null. Conversely, if $s_1$ is not null and if at block 48 parametric transformations of the subshapes belonging to the group $s_1$ are found in the set $C_0$, then the set $S_1$ will include those shapes corresponding to those parametric transformations. Accordingly, where i=2, the sum of sets $S_{2,1,0}$ will correspond to the sum of sets $S_2$ and $S_1$.

From block 54, the process flow continues to block 56, where it is determined whether i=N. This determination corresponds to a check of whether parametric transformations of the subshapes of each of the subshape groups $s_{i \ldots N}$ that are not null have been searched for.

If i does not equal N, then the process flow advances to block 58, where the connectivity of the subshapes of set $S_i$ relative to the set of shapes $C_i$, as well as the relative connectivity between the other parts of the decomposed left-hand shape, are determined. The relative connectivity of the parts of the left-hand shape may be determined by, for example, identifying with labels or weights the overlapping points of the subshapes of groups $s_1, s_2, \ldots, s_i$, and the subshape of the next group that is not null. In addition, the points in the shapes of set $C_i$ corresponding in location to the transformed, identified points in the groups $s_1, s_2, \ldots, s_i$, may also be identified with, for example, labels or weights. From block 58, the process flow returns to block 44, where the counter (i) is incremented such that the shape recognition function may resume with the subshapes of the next subshape group.

It should be recognized that prior to advancement of the process flow to decision block 56, the set of shapes $C_i$ has been generated at either block 42 or 52, as described hereinbefore. At block 42, the set $C_i$ is set to be the set $C_{i-1}$ because the set $s_i$ is null. Accordingly, when the process flow returns to block 46 (assuming the group $s_{i+1}$ is not null), in essence the set of shapes $C_{i-1}$ will be searched for the subshapes of group $s_{i+1}$. Conversely, if at block 48, a parametric transformation of a subshape of the group $s_i$ was found in the set of shapes $C_{i-1}$, then the set of shapes $C_i$ is generated at block 52, as described hereinbefore, as the set of shapes $s_i$ subtracted from the set of shapes $C_{i-1}$. Accordingly, when the process flow continues to block 46, the set of shapes $S_i$ subtracted from the set of shapes $C_{i-1}$ (i.e., the set of shapes $C_i$) will be searched for subshapes of the group $s_{i+1}$ (again, assuming the group $s_{i+1}$ is not null).

If at block 56 it is determined that i=N, which corresponds to a determination that the presence of parametric transformations of subshapes belonging to each of the subshape groups $s_{i \ldots N}$ which are not null have been searched for, then the process flow proceeds to block 59, where the sum of sets $S_{i \ldots N}$, as determined at block 54, corresponds to the parametric transformations of the left-hand shape of the selected rule found in the set of shapes $C_0$.

According to other embodiments of the present invention, the interpreter 12 may recognize parametric transformations of the left-hand shape of a selected rule according to process flows different than that illustrated in FIG. 4. For example, according to another embodiment, rather than adding the set of shapes $S_i$ to the sum of $S_{i-1 \ldots 0}$ at block 54 prior to the determination of whether i=N at block 56, the sets $S_{i \ldots N}$ may be summed together in one step after the determination of whether i=N to recognize the parametric transformations of the left-hand shape of the rule in the set of shapes $C_0$.

Once the parametric transformations of the left-hand shape of a selected rule is recognized in the set of shapes $C_0$ by the parametric shape grammar interpreter 12, as described hereinbefore with reference to FIG. 4, it may be determined whether the rule is to be applied to the set of shapes $C_0$. This determination may be made, for example, by an operator of the system 10 or the intelligent rule selection module 20. If a particular application of the rule is selected, the rule application module 18 may then apply the rule by subtracting the transformation of the left-hand shape of the rule from the initial shape and adding a transformation of the right-hand shape. After the rule is applied, the process flow illustrated in FIG. 4 may be repeated with the selection of a different rule from the set of predefined rules to be applied to the resulting shape (or shapes) from the application of the prior rule. If it is determined that the rule is not to be applied, the process flow illustrated in FIG. 4 may also be repeated with the selection of a new rule from the set of predefined rules to be applied to the original shape or shapes ($C_0$). According to another embodiment, the rule application module 18 may apply the rule for all transformations of the left-hand shape found in the set of shapes $C_0$, and the process may be repeated for all of the resulting shapes, thus producing all possible permutations resulting from application of the predefined set of rules in the initial design shape(s).

The I/O interface module 22 may be used to input data, such as the shape grammar rules, and to output data, such as the set of rules, the transformations of the left-hand shape of a particular rule found in a shape, and the shapes resulting from the application from a particular rule. The I/O interface module 22 may input and output the data, for example, in text and/or graphical form. The I/O interface module 22 may display data via a display device (not shown) in communication with the I/O interface module 22.

Thus, the parametric shape grammar interpreter 12 of the present invention permits parametric shape recognition of the left-hand shape of a shape grammar rule in an initial design shape(s). Unlike previous interpreters that are limited to Euclidean transformations (translation, rotation, and scaling) that can only be applied to whole shapes, the parametric shape grammar interpreter 12 can search for general parametric features of a subshape generated through decomposition of a shape, thus allowing for separate treatment of each subshape.

Figure 6:
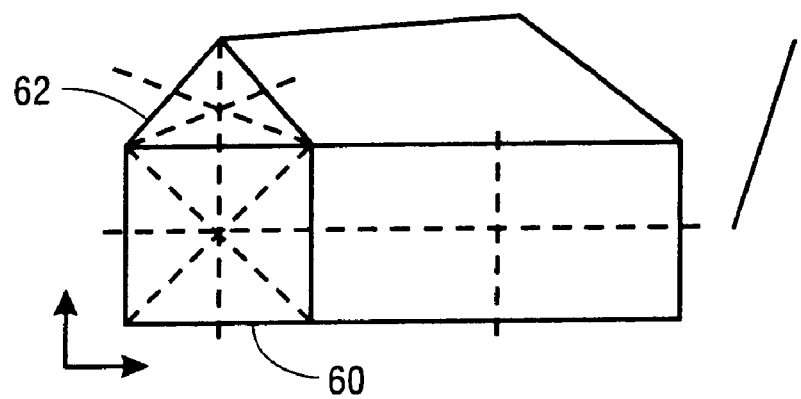

FIGS. 5-11 provide a shape decomposition example using the example default hierarchy of subshape groups defined hereinbefore with respect to Table 1. Consider the shape to be decomposed (such as the shape a in the rule a→b) to be that illustrated in FIG. 5. To recognize the transformations of the subshapes of the groups $s_{1-4}$, as defined hereinbefore, the lines of symmetry in the shape of FIG. 5 may first be determined. These lines of symmetry are illustrated in FIG. 6 as dashed lines. As illustrated in FIG. 6, each line of the square 60 is symmetric with the two lines of the square 60 that it intersects. In addition, each of the lines of the triangle 62 is symmetric with more than one line. Accordingly, these subshapes satisfy the requirements of the subshape group $s_1$, and can be subtracted from the example shape, resulting in the shape shown in FIG. 7, for which the subshapes of group $s_2$ may be searched.

Figure 7:
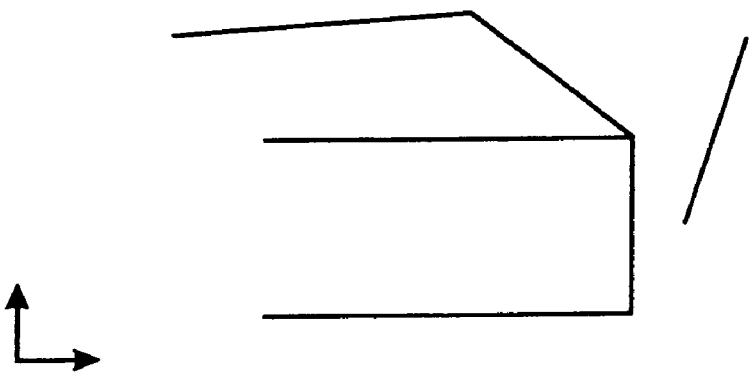
Figure 8:
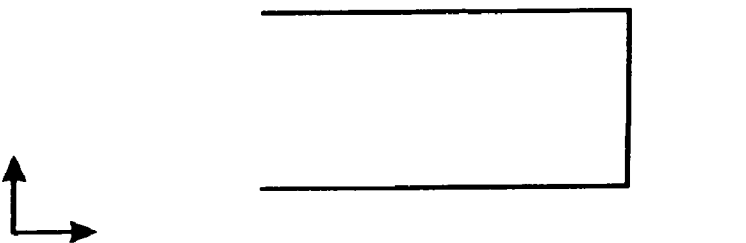

The resulting shape, shown in FIG. 7, contains two lines that are symmetric to only one other line. Additionally, there are two perpendicular intersections, comprised of three line segments, that satisfy the requirements of $s_2$, as illustrated in FIG. 8. Accordingly, this shape may be subtracted from the shape shown in FIG. 7, resulting in the shape shown in FIG. 9, which may be searched for subshapes of the group $s_3$.

Figure 9:
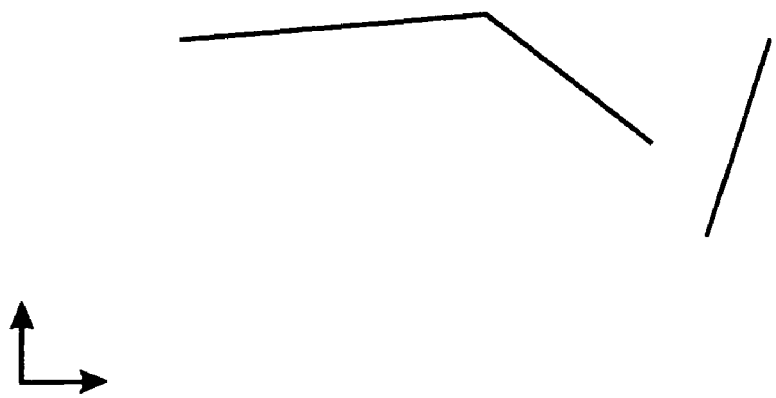
Figure 10:
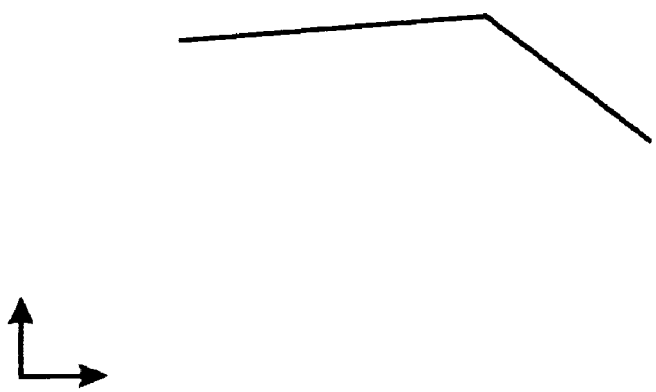
Figure 11:

The $s_3$ subshape illustrated in FIG. 10 is present in the shape of FIG. 9. As illustrated, the $s_3$ subshape is simply the intersecting line segments. Accordingly, this subshape may be subtracted from the shape of FIG. 9, resulting in the shape shown in FIG. 11, which corresponds to the subshapes comprising the $s_4$ group.

FIGS. 12-19 provide an example of parametric shape recognition, using the example default hierarchy defined hereinbefore with respect to Table 1, to recognize the presence of parametric transformations of the left-hand shape (a) of the rule (a→b) in a design shape ($C_0$). Consider the rule to be the rule a→b illustrated in FIG. 12, and consider the initial design shape ($C_0$) to which the rule is to be applied to be the shape illustrated in FIG. 13. As described hereinbefore, in order to apply the rule a→b to the design shape $C_0$, the left hand shape (a) of the rule must be found to be a parametric subshape under various transformations (τ) of the shape $C_0$. Using the default hierarchy defined hereinbefore with respect to Table 1, the shape a may be decomposed into the four subshapes where $a=s_1+s_2+s_3+s_4$.

Figure 12:
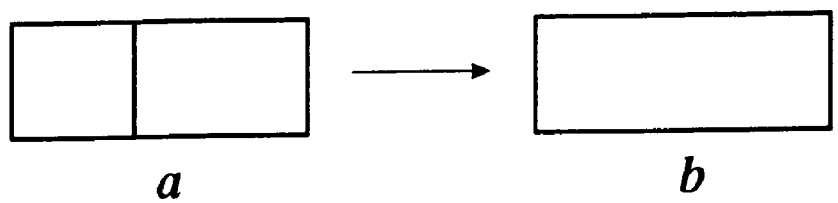
FIGS. 12-19 are diagrams illustrating a method of parametric shape recognition according to one embodiment of the present invention.
Figure 13:
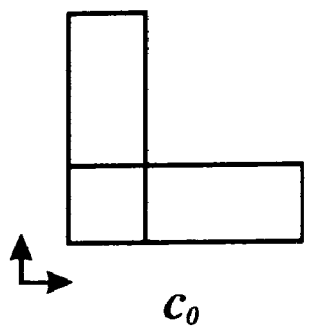
Figure 14:
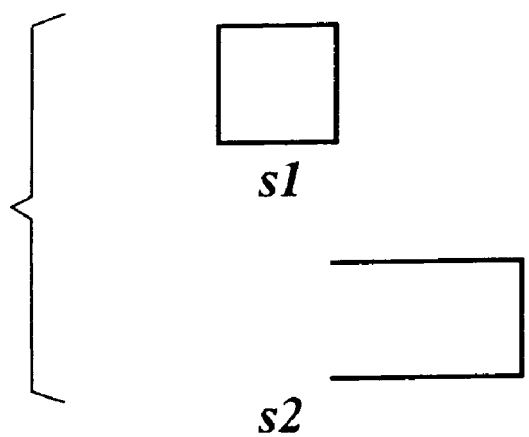

For the shape a shown in FIG. 12, using the default hierarchy defined hereinbefore with respect to Table 1, the subshapes comprising groups $s_1$ and $s_2$ are shown in FIG. 14, and the groups $s_3$, $s_4$ are null. The shape recognition process, as described hereinbefore, may begin with the most constrained subshape group that is not null and skipped any less constrained groups that are null. Such an embodiment produces a more efficient shape recognition process because the more highly constrained shapes have fewer possible transformations. Thus, for the rule shown in FIG. 12, the $s_1$ subshape is searched first, and then the $s_2$ subshape is searched.

Figure 15:
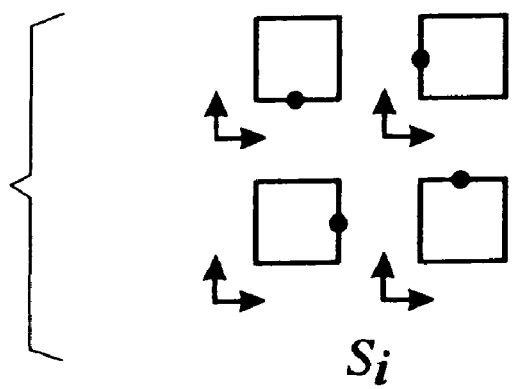
Figure 16:
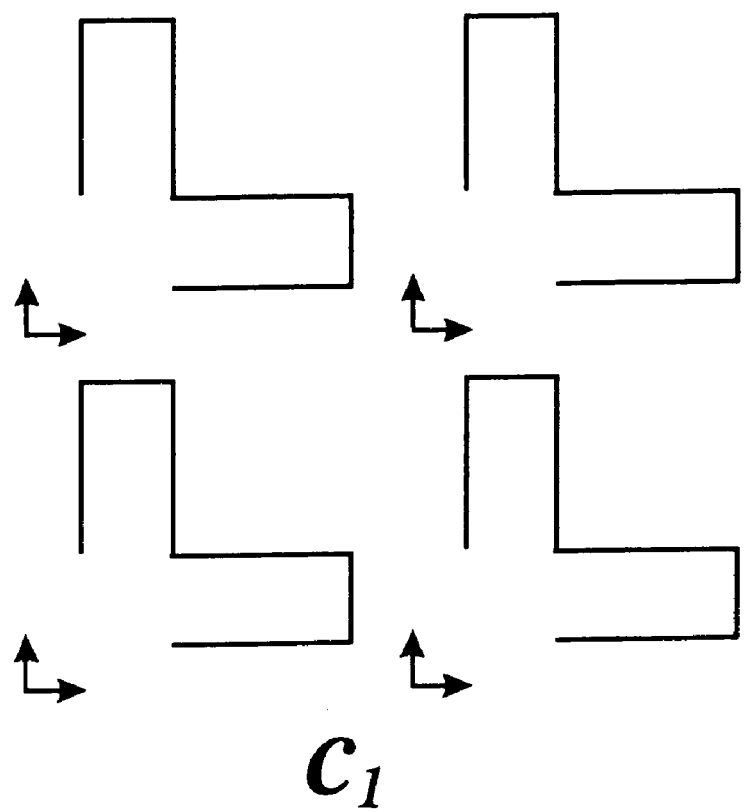

Permissible transformations of the $s_1$ subshape may be found multiple times in the shape a, resulting in four instances of $s_1$ subshapes in this example. These transformations, as described hereinbefore, are defined as the set $s_1$, and are shown in FIG. 15. The four shapes of $S_1$ are equal but are found differently within the initial design shape by the rotation of $s_1$ subshape four different ways (0°, 90°, 180°, and 270°). The dots in FIG. 15 are to show the various transformations of the $s_1$ subshape found in the shape a. Having found the set of shapes $S_1$, the set of shapes $C_1$ is generated, which is the result of the set of shapes $S_1$ subtracted from $C_0$. The set of shapes $C_1$ is shown in FIG. 16.

Figure 17:
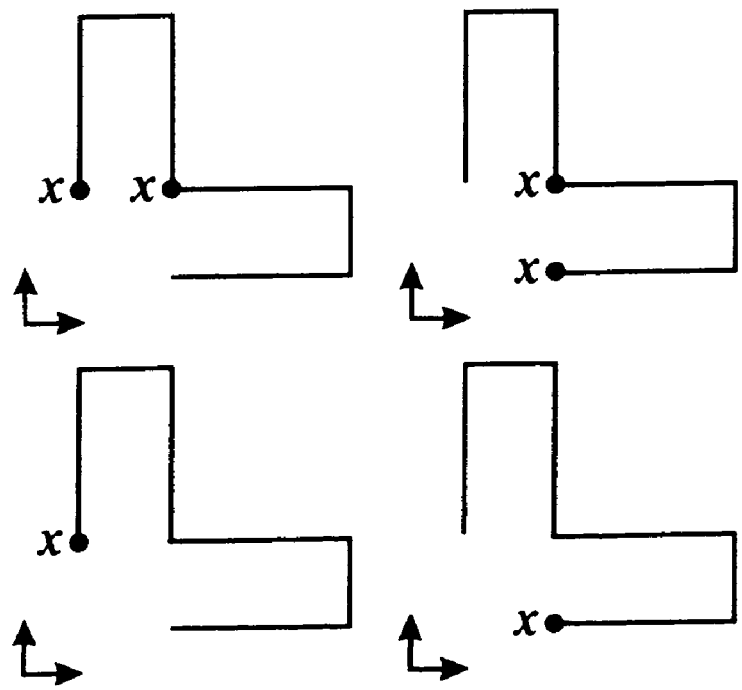

By definition of the subshape groups $s_1$, $s_2$, $s_3$, and $s_4$, it can been seen that no two groups will share any common line segments. They will, however, share common line segment end points. Accordingly, the relative connectivity of the shapes of groups $s_1$ and $s_2$, as well as the relative connectivity of the transformed instance of $s_1$ and the set of $C_1$ shapes may be identified, as illustrated in FIG. 17.

Next, as described hereinbefore, the set of shapes $C_1$ is searched for the next most constrained subshape group, which for this example, is the $s_2$ group. As can be appreciated, two permissible transformations of the $s_2$ subshape may be found in each of the shapes of $C_1$. The set of the subshapes thus define the set $S_2$. Next, as described hereinbefore, the set of shapes $S_2$ is subtracted from the set of shapes $C_1$ to define the set of shapes $C_2$. Next, the intersection points between the marked shapes $S_2$ and the corresponding shapes $C_2$ are identified.

Figure 18:
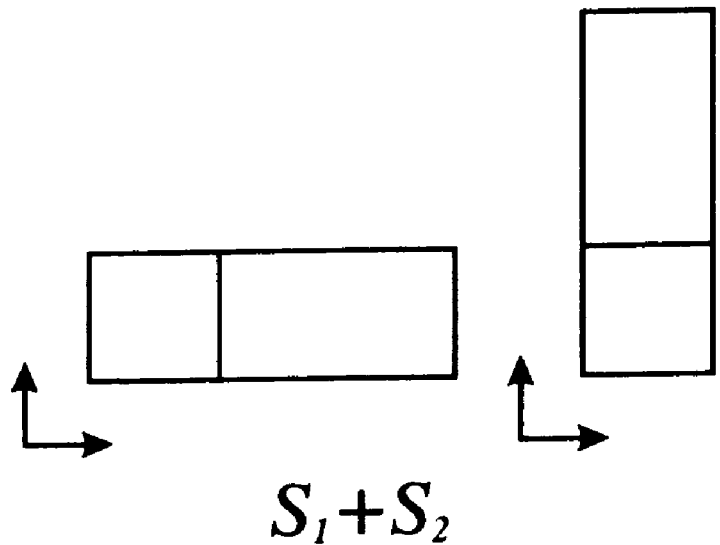
Figure 19:
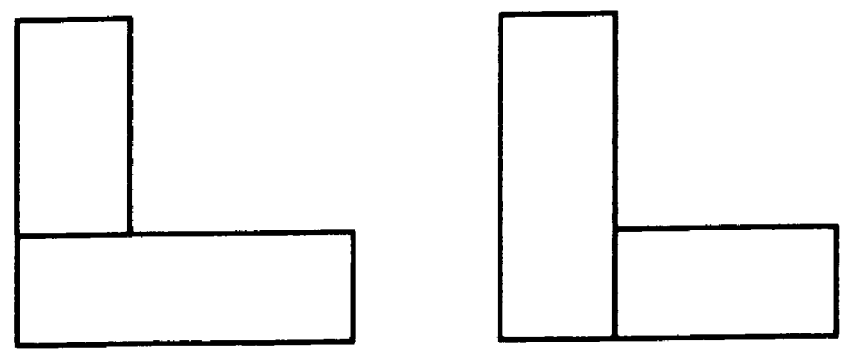
Figure 20:
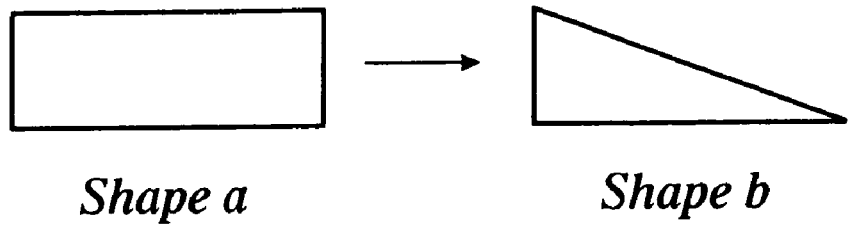
FIGS. 20-23 are diagrams illustrating a method of using parametric shape recognition to apply a given shape grammar rule to a given initial design shape according to one embodiment of the present invention.
Figure 21:
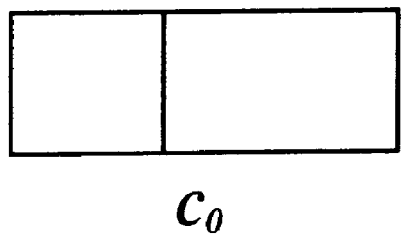
Figure 22:
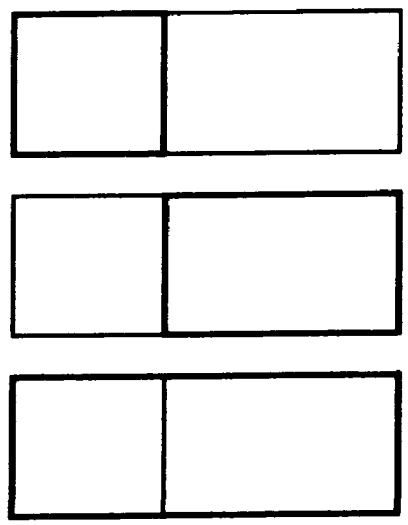
Figure 23:
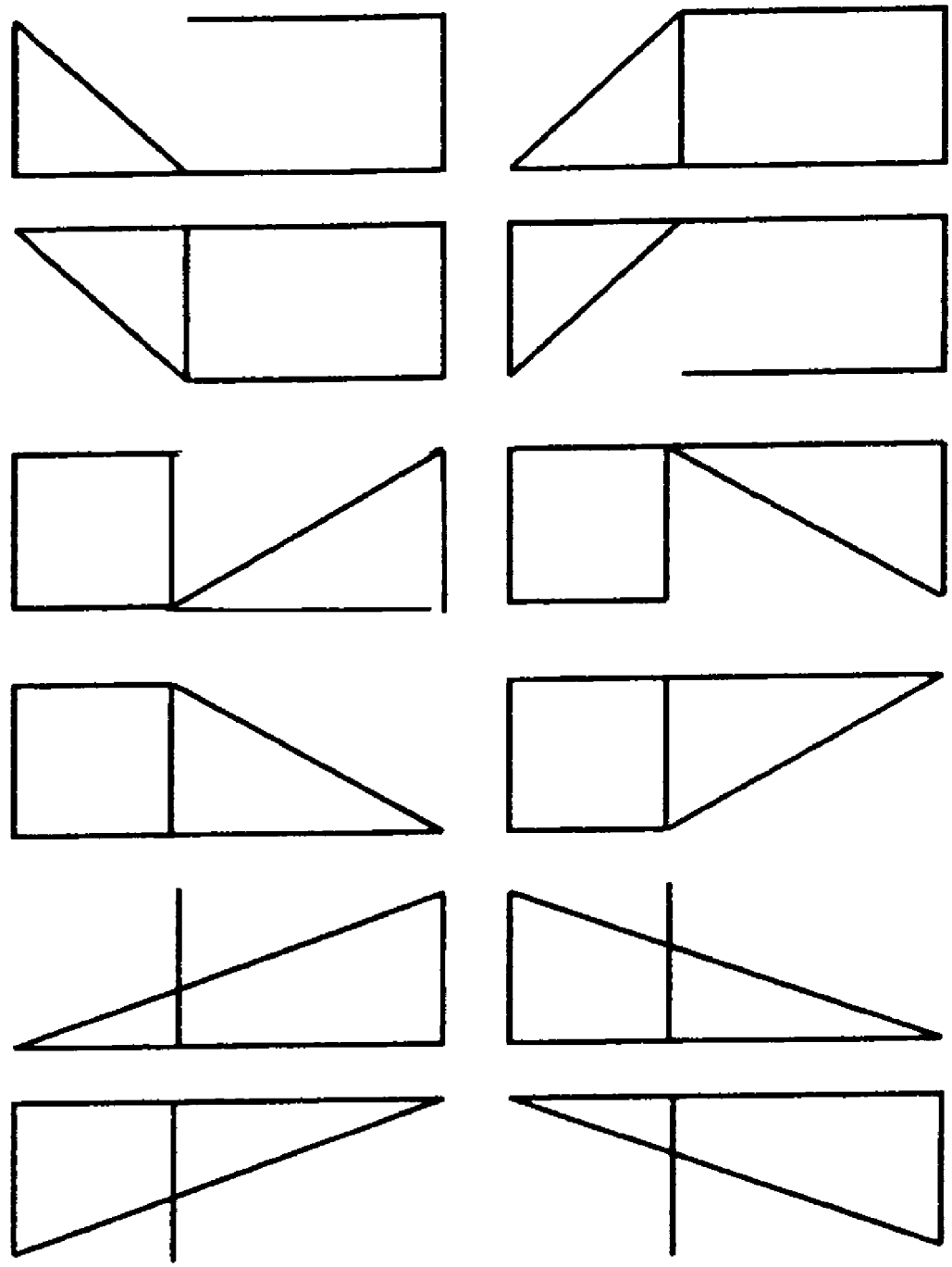
Figure 24:
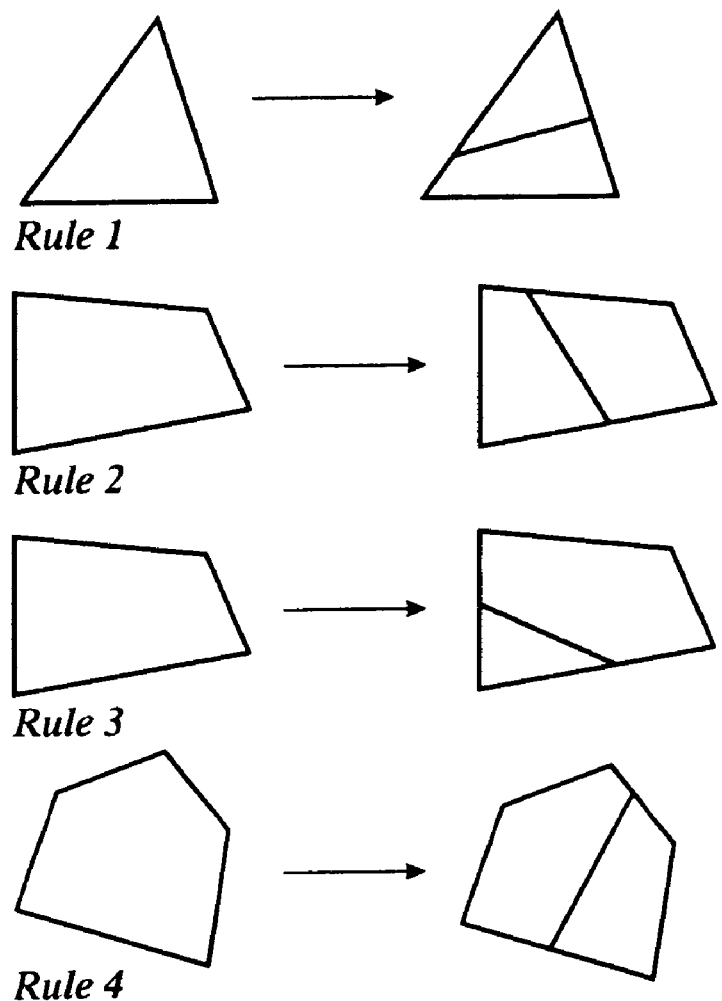
Figure 25:
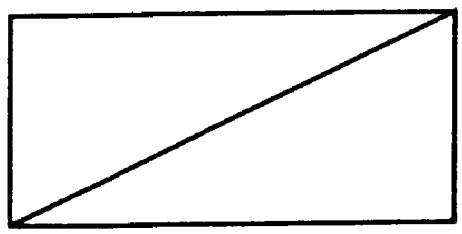

The sets $S_1$ and $S_2$ are then added such that their connectivity is maintained to produce the subshapes illustrated in FIG. 18. Because the groups $s_3$ and $s_4$ are null, as described hereinbefore, the shapes illustrated in FIG. 18 represent the parametric transformations of the left-hand shape a of the rule a→b (illustrated in FIG. 12) found in the initial design shape $C_0$ (illustrated in FIG. 13). The two possible applications of the rule may then be applied to the shape $C_0$ to produce the shapes illustrated in FIG. 19.

FIGS. 20-23 provide an example of parametric rule application. Consider the rule to be applied as the rule a→b illustrated in FIG. 20, and the initial design shape $C_0$, to which the rule is to be applied, as the shape illustrated in FIG. 21. Using the default hierarchical subshape groups described hereinbefore with respect to Table 1, it can be recognized that the left-hand shape (a) of the rule has constraints that limit the parametric shape search to perpendicular intersections. This corresponds to group $s_2$. Twelve permissible transformations of the $s_2$ shape may be found in the shape $C_0$, three of which are shown in bold in FIG. 22. Because the subshape groups $s_1$, $s_3$, and $s_4$ are null for this example, the sum of sets $S_{1-4}$ includes only the twelve transformations of the $s_2$ subshape found in the shape $C_0$. Accordingly, the shape a may be recognized twelve times in the shape $C_0$, with application of the rule for each of the transformations resulting in the shapes illustrated in FIG. 23.

FIGS. 24-27 provide another example of a parametric shape grammar application using the default hierarchy of subshape groups described hereinbefore with respect to Table 1. For the example, the set of rules illustrated in FIG. 24 comprise the predefined shape grammar rules, and the initial design shape is the shape illustrated in FIG. 25. Upon examining each of the rules, it can be recognized that the left-hand shapes of each rule fall into the $s_3$ group because of the lack of symmetry and perpendicular intersections. Therefore, in general, each of the rules may be applied if a shape corresponding to a permissible parametric transformation of the left-hand shape of any of the rules is recognized in the initial design shape. For example, rule 1 is applicable if any triangle can be recognized, and rule 4 may be applied if any five-sided polygon can be recognized. The progression of shapes illustrated in FIG. 26 depict the application of a series of these rules using the parametric shape grammar interpreter 12 for shape recognition. For the shapes illustrated in FIG. 26, the subshape to which the indicated rule is to be applied is highlighted in bold. The progression of rule application may continue, such as by randomly choosing the applicable rules as well as the parameters, producing final design shapes such as those illustrated in FIG. 27.

An extension can be made to the hierarchical method of parametric shape recognition described above for parametric recognition of curved line shapes. This extension uses a two-step approach that first performs shape matching with an equivalent straight-line shape then checks those transformations for matching with the actual curved lines. This approach has advantages over just matching characteristic polygons in that it can match equivalent curves with differing characteristic polygons as well as emergent shapes.

Figure 28:
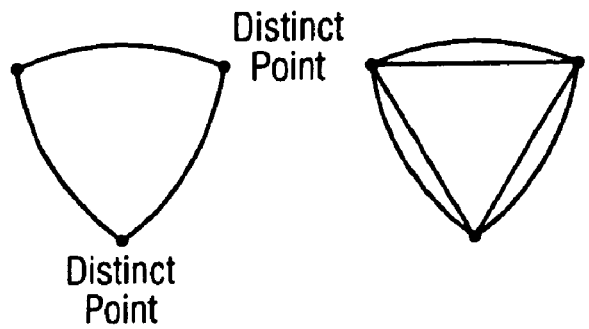
FIG. 28 is a shape consisting of three curved lines in which the distinct points are marked.
Figure 29:
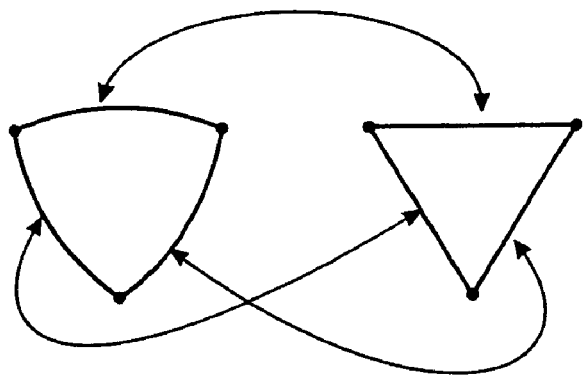
FIG. 29 shows the curved line shape of FIG. 28, its distinct shape, and the correspondence between distinct lines and curved lines.

The equivalent straight-line shape is referred to as the distinct shape, as it is a collection of lines connecting distinct points from the curved shape. The set of distinct points, which can be defined by the user, includes points such as intersections between curves and curve endpoints. FIG. 28 is a shape consisting of three curved lines in which the distinct points are marked. The connectivity of the distinct points is then represented by a set of straight-line segments, which correspond to a curved line or a portion of a curved line, and combine to form the distinct shape. FIG. 29 shows the curved line shape of FIG. 28, its distinct shape, and the correspondence between distinct lines and curved lines.

Figure 30:
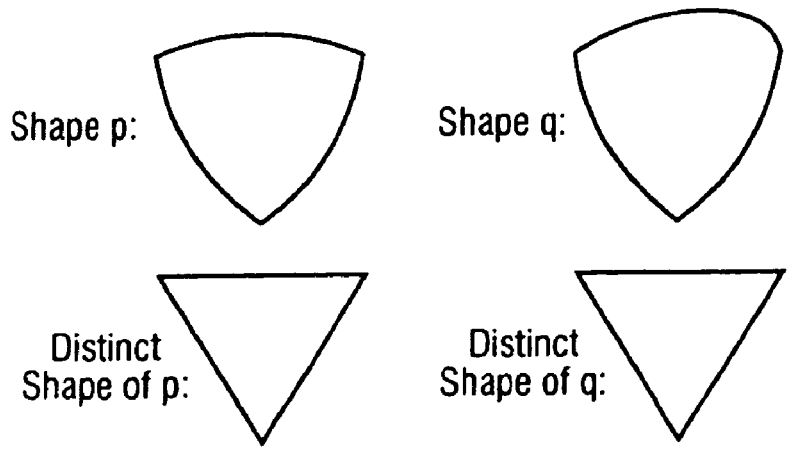
FIG. 30 shows two shapes consisting of curved lines and their distinct shapes, shapes p and q.

A hierarchy is again established that specifies the spatial relations and appropriate transformations at each of its levels. However, this method differs from the previously described method in that the types of transformations used during the matching of the distinct shape are derived from the spatial relations of the curved shape and not the distinct shape itself. This is done because while the distinct shape serves as an equivalent of the curved shape for the initial coarse matching, it may misrepresent the spatial relations between the curved lines. For example, FIG. 30 shows two shapes consisting of curved lines and their distinct shapes, shape p and shape q. Shape p has three lines of reflective symmetry while shape q has only one line of reflective symmetry. However, they share the same distinct shape, an equilateral triangle. If the types of transformations were chosen based on the distinct shape, a search for shape q may result in an incorrect set of matches. Hence, the types of transformations for the coarse matching are derived from the curved line shape. This is shown in a sample hierarchy in Table 2. The two stage matching process is demonstrated through an example, and then a general approach is given as pseudo-code.

TABLE 2

| Subshape Group | Spatial Relations | Transformations |
| --- | --- | --- |
| Curved Shape | | |
| $s_1$ | symmetry across more than one line | translation, rotation, isotropic scaling |
| $s_2$ | symmetry across one line | translation, rotation, anisotropic scaling |
| $s_3$ | the remaining lines | all |
| Distinct Shape | | |
| $s_1$ | | translation, rotation, isotropic scaling |
| $s_2$ | | translation, rotation, anisotropic scaling |
| $s_3$ | | all |

Figure 31:
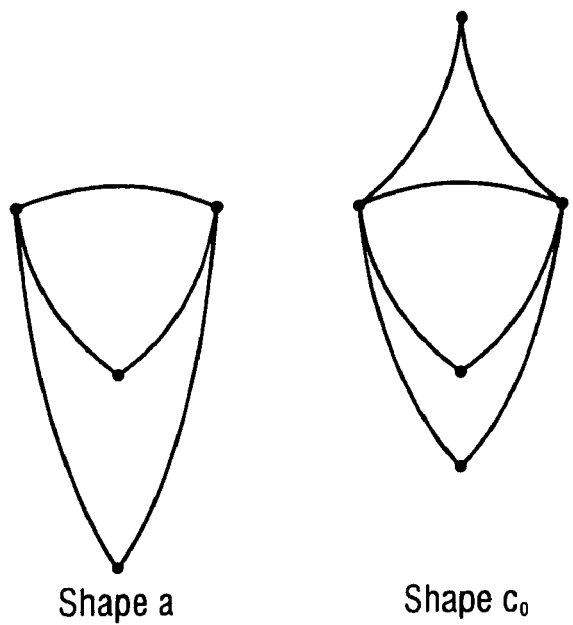
FIG. 31 illustrates a shape (a) to be searched for in shape c0.
Figure 32:
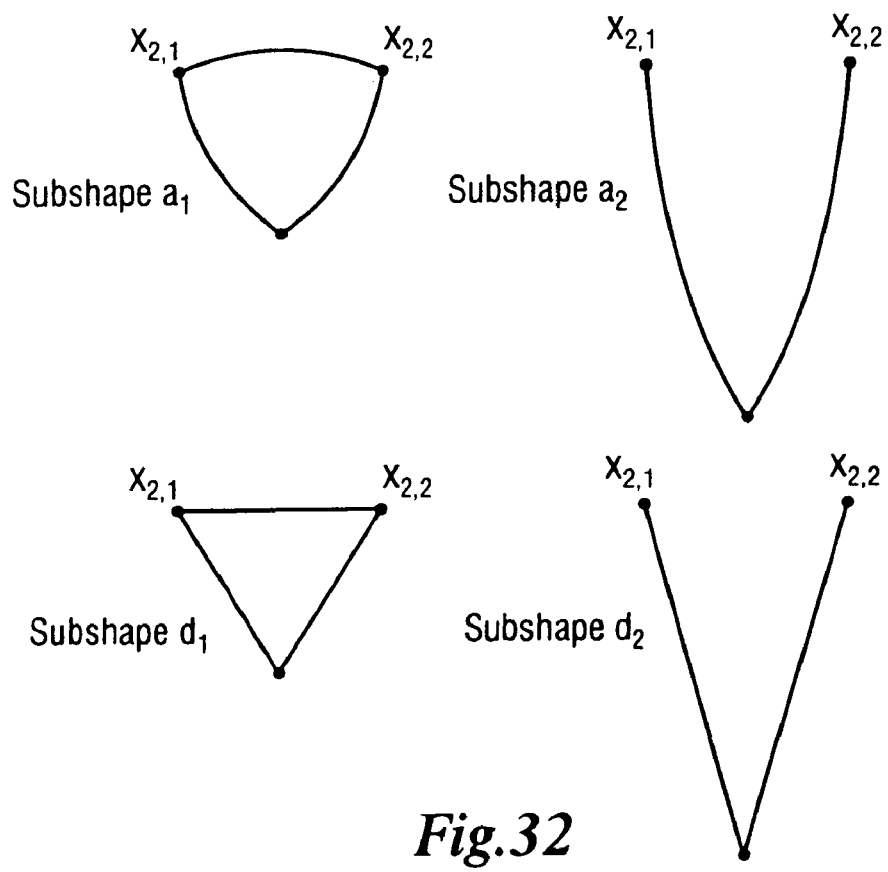
FIG. 32 illustrates two subshapes of the shape (a).
Figure 33:
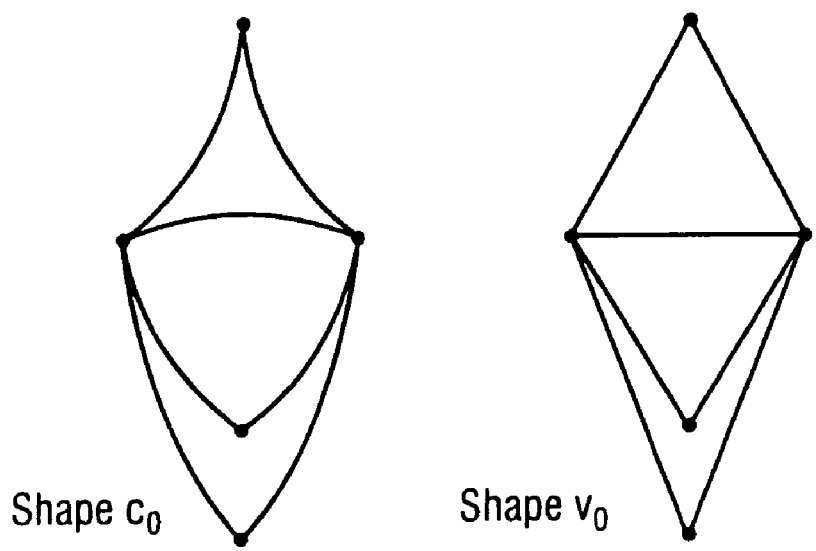
FIG. 33 illustrates the distinct shape the $v_0$ of shape $c_0$.

FIG. 31, shape (a) is to be searched for in shape $c_0$. Shape (a) can be decomposed into a set of n subshapes and searched for individually, maintaining the connectivity of the subshapes throughout the search with labels, as was previously outlined for straight lines. In this example, shape (a) has two subshapes, $a_1$ and $a_2$ as shown in FIG. 32. The search begins by finding the distinct shapes $d_i$ for each of the subshapes $a_i$ and the distinct shape $v_0$ of shape $c_0$. For this search $d_1$ and $d_2$, the distinct shapes for subshapes $a_1$, and $a_2$ respectively, are shown in FIG. 32 and distinct shape $v_0$ of shape $c_0$ is shown in FIG. 33. Shape $v_0$ is placed in the set of shapes $V_0$. This notation change is useful when the matching process is described as a loop.

Beginning with the most highly constrained level of the hierarchy, which is $d_1$ in this example, a search is performed for instances of $d_i$ in each shape $v \in \{V_{i-1}\}$, $$F_i = \{\tau(d_i) \leq v | \forall \tau \epsilon \tau_i\}.$$

Figure 34:
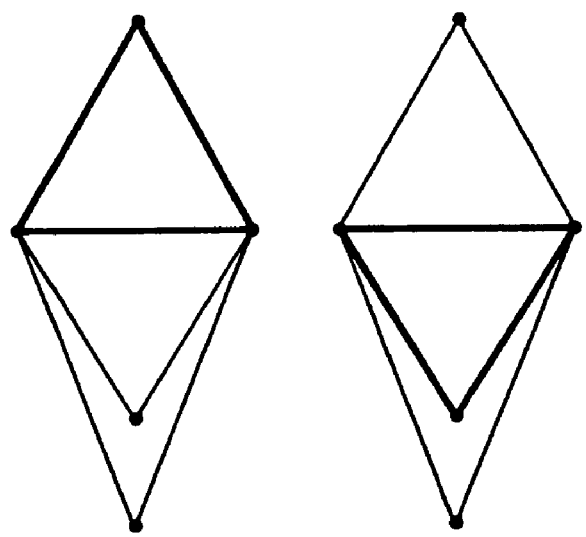
FIG. 34 illustrates matching shapes that result from the search for $d_1$ in $v_0$.

The set of transformations, $\tau$, used in this search comes from those specified by the user in the hierarchy. In this example, shape $d_1$ is searched for in shape $v_0$ (the only shape in $V_0$) using the set of transformations $\tau_1$ that are indicated as appropriate for $a_1$ by the user in the hierarchy. The hierarchy of spatial relations, and transformations for this problem, are shown in Table 3. The search reveals two matching shapes with six different orientations of labeled points each. The two matching locations (without labeled orientation) are shown in bold in FIG. 34. The search can be restricted further by noting that the labeled distinct points of shape $d_1$ must be matched with distinct points in $v_0$ that are the intersecting point of more than two line segments. The additional information reduced the number of matches to four total, which are stored in the set of shapes $F_1$ and are shown in bold in FIG. 35.

TABLE 3

| | Subshape Group | Spatial Relations | Transformations |
| --- | --- | --- | --- |
| Curved Shape | $s_1$ | reflective symmetry with more than one line | translation, rotation, isotropic scaling |
| | $s_2$ | reflective symmetry with one line | translation, rotation, anisotropic scaling |
| Distinct Shape | $s_1$ | | translation, rotation, isotropic scaling |
| | $s_2$ | | translation, rotation, positive anisotropic scaling |

Figure 36:
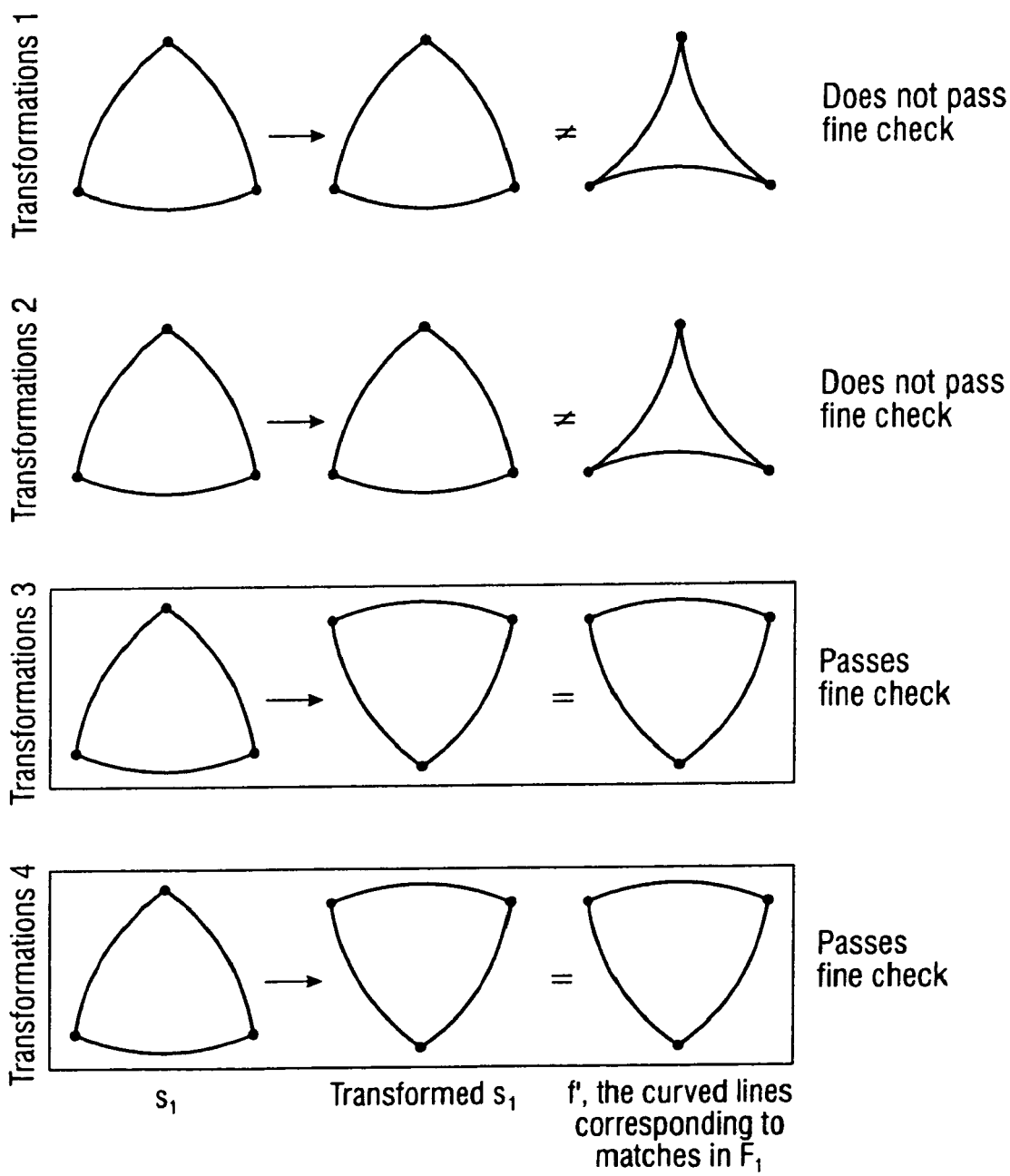
FIG. 36 illustrates the curved line shapes corresponding to the distinct shapes in $F_1$ as compared to $(a)_1$.
Figure 37:
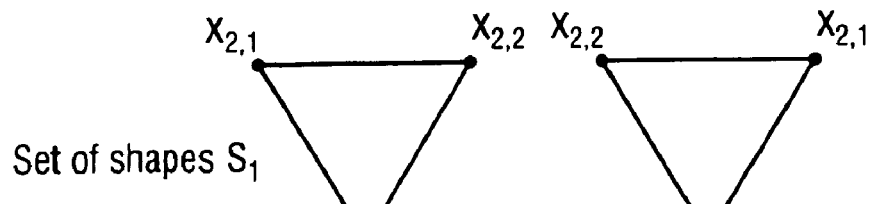
FIG. 37 illustrates two transformations of $a_1$ that pass the fine check.

Each shape f in the set $F_i$ (instances of $d_i$ in $V_{i-1}$) corresponds to a set of curved lines in shape $c_0$, which collectively form the curved line shape f'. The corresponding curved lines, f', are compared with subshape $\tau(a_i)$, where the transformation $\tau$ is the same set of transformations used to match $d_i$. This is the fine stage of matching. For each successful fine match f', the corresponding distinct shape f is placed in the set $S_i$. Returning to the example, the curved line shapes corresponding to the distinct shapes in $F_1$ are compared to $\tau(a_1)$ in FIG. 36. There are two transformations of $a_1$ that pass the fine check, and the corresponding distinct shapes are placed in the set $S_1$ (FIG. 37).

The fine check can be performed using a number of different methods. Three of these methods are determining curve segment equivalence by comparing control polygons, sampling points along the curves, and determining tangency of the curve segments. Control polygons can be compared for equivalence if the number of control points defining each curve is the same. Control points can be added to the polygon with fewer points without changing the curve in order to allow for comparison. Adding points and comparing control polygons are simple and efficient processes. Sampling points is a simple method of determining equivalence by checking for the existence of a set of points on both lines. However, point sampling may lead to inaccuracies if an insufficient number of points is selected. If both curve segments are tangent to each other along their lengths then the two segments are equivalent. Determining tangency between two curves can be performed using, for example, the technique described by Sederberg and Nishita (1990) "Curve intersection using Bezier clipping" *Computer-Aided Design* 22 538-549. Their method involves determining a point or region where tangency occurs by clipping away portions of the curves not tangent to each other. If this method is unable to clip any portion of either curve, then the two segments are equivalent. Sederberg and Nishita's algorithm is efficient, but comparing control points may be the most straightforward and efficient method for determining curve segment equivalence.

Figure 38:
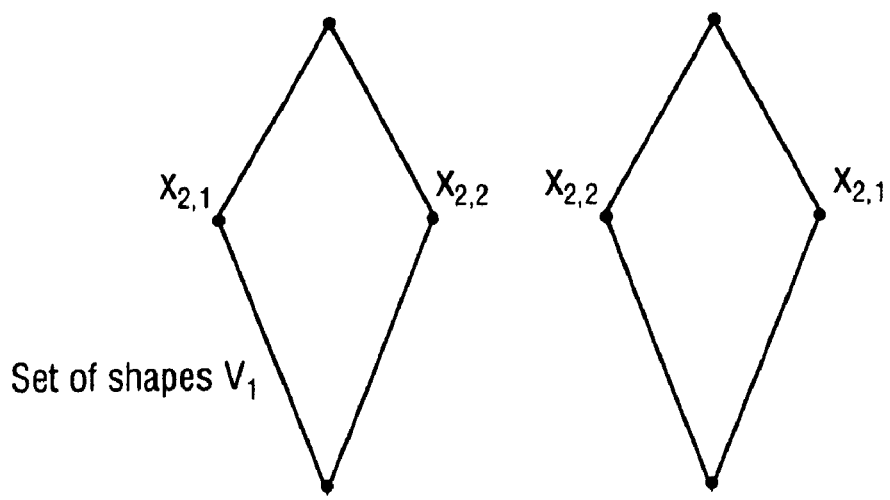
FIG. 38 illustrates a set of shapes $V_1$.

Each shape s in $S_i$ is subtracted from shape v in $V_{k-1}$ for which it is a subshape and the shared points between the difference and s are labeled to maintain connectivity, $$\forall s \in S_i, V_i = \{g(s, v-s)\},$$

where g(y, u) is the operation that transfers the connectivity labels from shape y to shape u. The labels are of the form $x_{j,m}$ where j is the less constrained subshape grouping number and m is an index. This is the same labeling technique described in the straight line matching section. The resulting labeled shapes are stored in the set $V_i$. In the example, each shape in $S_1$ is subtracted from shape $v_0$ (the only shape in $V_0$) and the shared points between the difference and the shapes in $S_1$ are labeled as such. The resulting labeled shapes are stored in the set $V_1$ (FIG. 38).

The general method is used iteratively until all subshapes of a decomposed shape have been searched for or until one of the searches produces no results. If one of the subshape searches is unsuccessful then there is no instance of shape (a) in $c_0$. If the search is successful for each subshape then instances of shape (a) in $c_0$ are produced by subtracting each shape in $V_n$ from $v_0$ and finding the corresponding curved lines of the difference.

Figure 39:
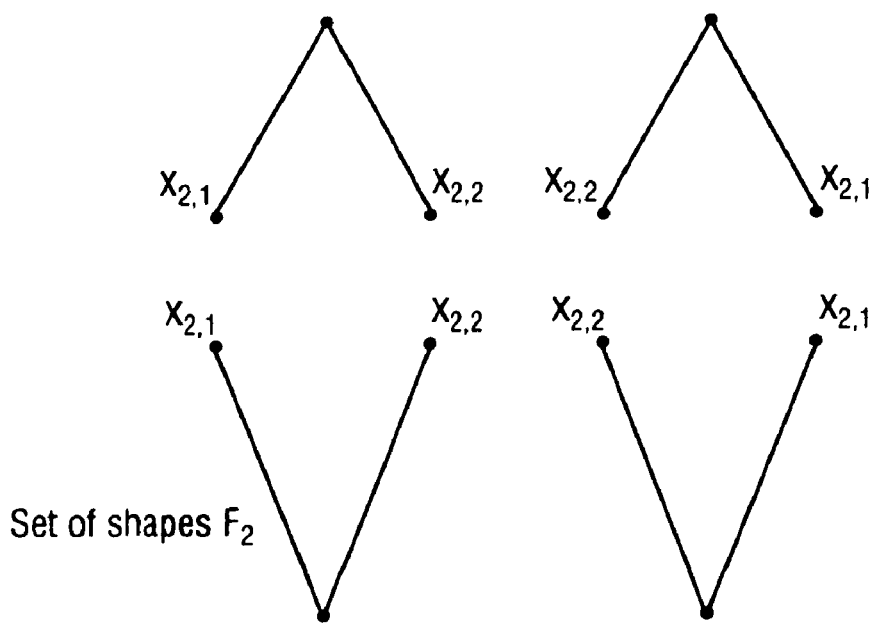
FIG. 39 illustrates a set of shapes $F_2$.
Figure 40:
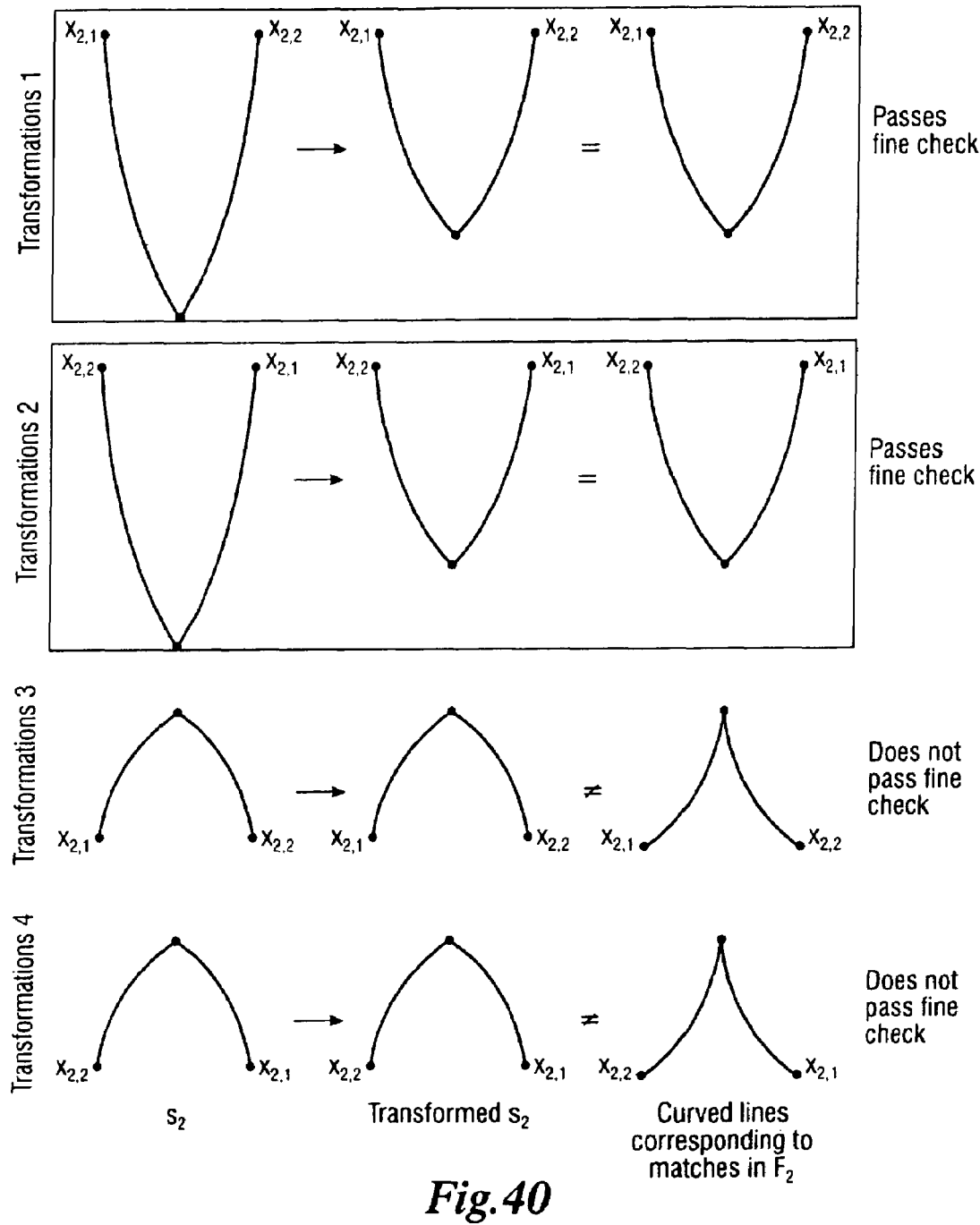
FIG. 40 illustrates a comparison of the curved line shapes corresponding to the distinct shapes in $F_2$ with a transformed version of $a_2$.
Figure 41:
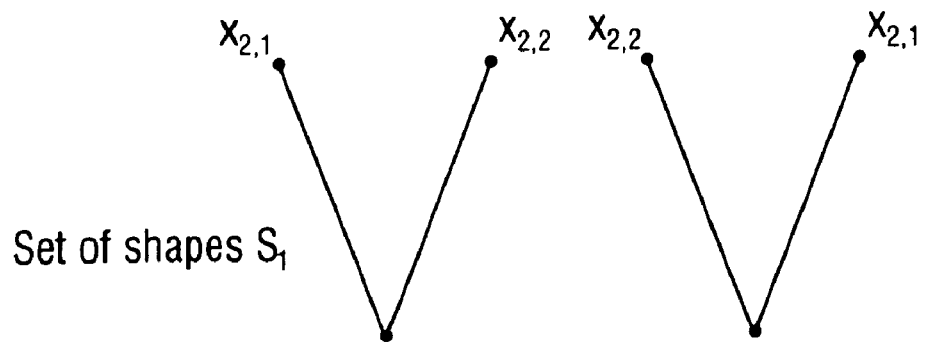
FIG. 41 illustrates shapes passing the fine check and corresponding distinct shapes which are placed in the set of shapes $S_2$.
Figure 42:
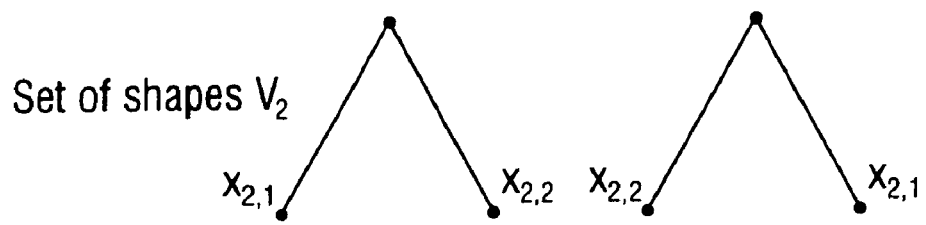
FIG. 42 illustrates a set of shapes $V_2$ illustrating the resulting difference in shapes after a subtraction process.

The example continues by searching for distinct shape $d_2$ in each shape in $V_1$ using the appropriate transformations from the given hierarchy. There are four matches, which comprise the set of shapes $F_2$ (FIG. 39). The curved line shapes corresponding to the distinct shapes in $F_2$ are then compared with a transformed version of $a_2$ (FIG. 40). Two of these shapes pass the fine check and the corresponding distinct shapes are placed in the set of shapes $S_2$ (FIG. 41). Each shape in $S_2$ is then subtracted from the shape in $V_1$ for which it is a subshape. The resulting difference of shapes is stored in the set $V_2$ (FIG. 42).

Figure 43:
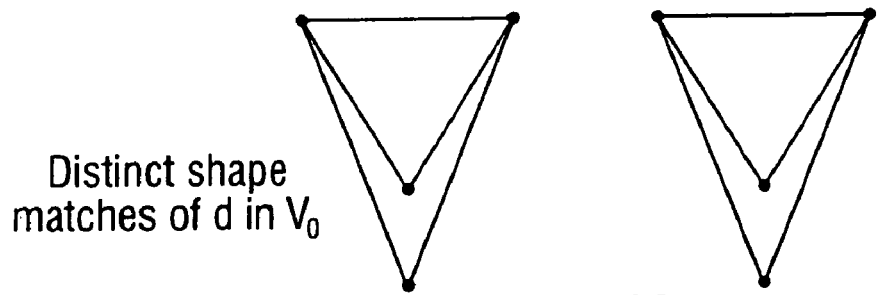
FIG. 43 illustrates the result of subtracting each member of $V_2$ from $v_0$.
Figure 44:
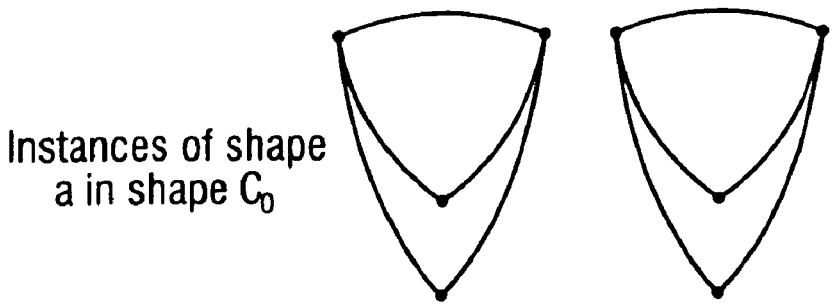
FIG. 44 illustrates the curved line shapes and matches of shape(a) in $c_0$.

There are no additional subshapes of shape (a) so the search is terminated. The matching instances of shape (a) in $c_0$ are the curved line shapes corresponding to the difference of distinct shape $v_0$ and each shape in $V_2$. The result of subtracting each member of $V_2$ from $v_0$ is shown in FIG. 43. The corresponding curved line shapes and matches of (a) in $c_0$ are shown in FIG. 44. The general curved line matching process is described in pseudo-code form in the Table 4. The pseudo-code represents software that would be employed to configure a general purpose computer to create specific logic circuits which correspond to any claimed "means" limitations, but are not necessary the only support for such "means" limitations appearing in any claims.

TABLE 4

Figure 45:
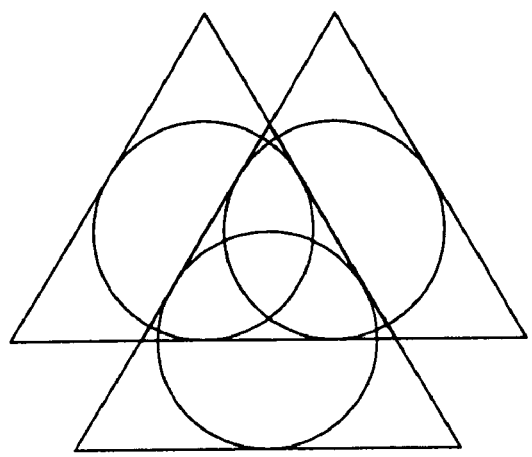
FIG. 45 illustrates another target shape.
Figure 46:
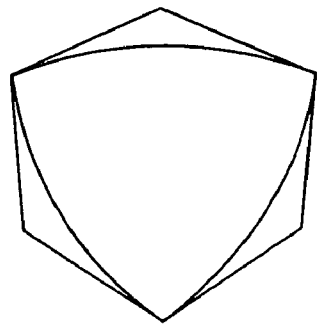
FIG. 46 illustrates the shield shape of interest.
Figure 47:
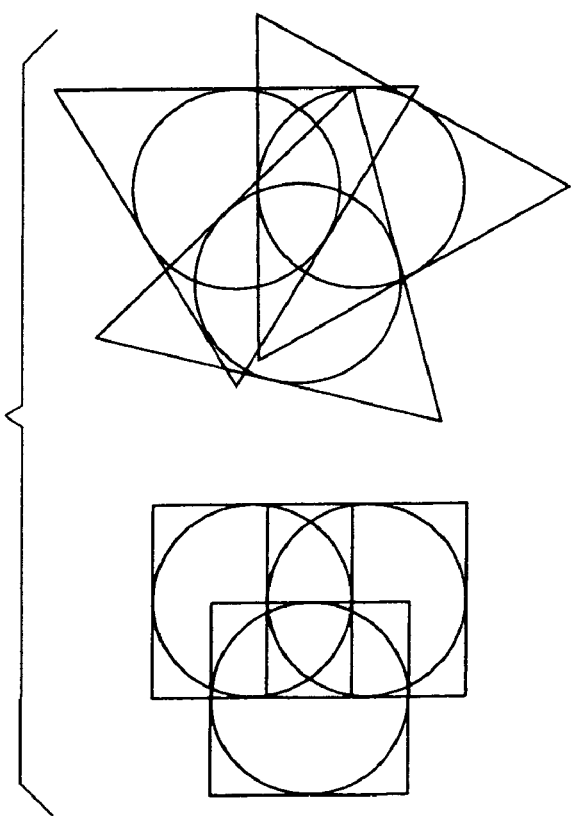
FIG. 47 illustrates the equivalent target shapes with different characteristic polygons.

Notes for pseudo-code:
Lower case represents a single shape
UPPER CASE represents a set of shapes
Given shape a, find an instance of shape a in shape $c_0$ by using a user-defined shape hierarchy of n levels
    Determine shape d, the distinct shape of shape a
        Decompose shape a into n subshapes where $a_i$, i=1 . . . n, corresponds to subshape
        grouping $s_i$ from the user's hierarchy and shape $d_i$ is the distinct shape
        corresponding to subshape $a_i$
    Shape $c_0$ is placed in the set of shapes $C_0$
    Shape $v_0$, the distinct shape of shape $c_0$, is placed in the set of shapes $V_0$
    m=0
    For i=1 to n
        For j = i+1 to n
            Mark shared points between $d_j$ and $d_i$ with label $x_{j,m}$
            m=m+1
    For k=1 to n
        For each shape v that is a member of the set of shapes $V_{k-1}$:
            Search for instances of shape $d_k$ in shape v using $t_k$, the transformations specified
            as appropriate for $a_k$
            Store all instances of $d_k$ in v whose labels at levels 1 . . . k match in $F_k$
            For each distinct shape f that is a member of the set of distinct shapes $F_k$:
                Shape f' is the curved lines in $c_0$ corresponding to f
                If f'=$t_k(a_k)$
                    Put f in set of shapes $S_k$
            For each shape s that is a member of the set of shapes $S_k$:
                v' = v − s
                Copy the shared point labels between v' and s
                Put v' in set of shapes $V_k$
            If k = n
                For each shape $v_k$ that is a member of the set of shapes $V_k$:
                    An instance of the original shape is equal to the shape
                    corresponding to the distinct shape $v_0 − v_k$ Another example of a curve matching process is shown in FIG. 45. FIG. 45 contains the target shape, three intersecting circles. The triangle around each circle is the characteristic polygon used to define the circle. The shape being searched for is the shield shape in FIG. 46. Again the straight lines represent the characteristic polygon. Matching the shield within the intersecting circles requires matching the actual curves and not simply the characteristic polygon because the line segment that we wish to match in the target does not have a control polygon specifically for it and the representation of the arcs that compose the circle is not unique. FIG. 47 contains two sets of intersecting circles equal to the one in FIG. 45 but with different characteristic polygons.

Figure 48:
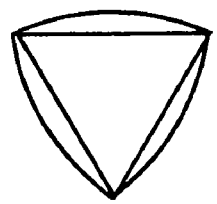
FIG. 48 illustrates the distinct shape of the shield as an equilateral triangle.
Figure 49:
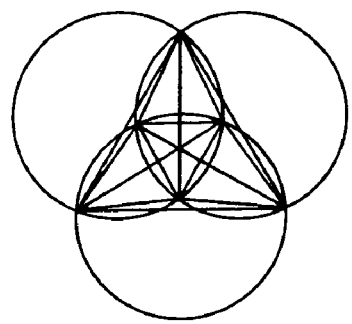
FIG. 49 illustrates the distinct shape of the target as a set of triangles.

Finding the shield shape begins by determining the distinct points in the shield and the target shapes. Distinct points arise from line segment intersections and endpoints. Further specificity concerning the type of the intersection will reduce the computation time. From the distinct points, distinct shapes can be formed which match the topology of the curved shape and contain at least as much symmetry as the curved shape. The distinct shape of the shield is shown in FIG. 48 and the distinct shape of the target in FIG. 49.

Figure 50:
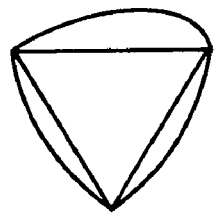
FIG. 50 illustrates the symmetry of the shape as coming from the curved lines because of the information lost in the distinct shape representation.

The shield shape can now be decomposed into a hierarchy of subshapes in order that specific shape features are preserved during the matching. The shape features are determined by examining the curve because the distinct shape may mask the lack of symmetry actually present in the shape. A shape whose distinct shape is the same as FIG. 46 but whose curved lines lack symmetry is shown in FIG. 50. A simple hierarchy for curved shape matching is seen in Table 5. This hierarchy serves as a default approach that handles symmetry but not issues of continuity beyond endpoint sharing between endpoints. Other hierarchies can be created by the grammar rule writer, as the rules are being created to meet the shape matching needs of the grammar.

TABLE 5

| Hierarchy level | Spatial relations preserved | Transformations allowed |
|---|---|---|
| 1 | Symmetry in more than one direction | Translation, rotation, isotropic scaling |
| 2 | Symmetry in one direction | Translation, rotation, an-isotropic scaling |
| 3 | Topological match and matching based on user criteria | Decompose shape into secondary hierarchy for point matching |
| 4 | Indeterminate cases | Requires a rule of thumb, labels, or some other means to eliminate ambiguity |

Figure 51:
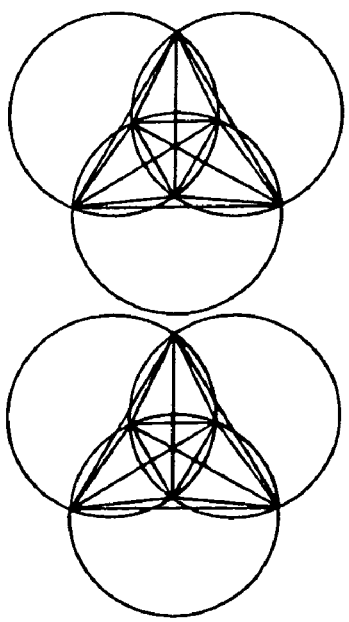
FIG. 51 illustrates the distinct shape matches in the target shape.
Figure 52:
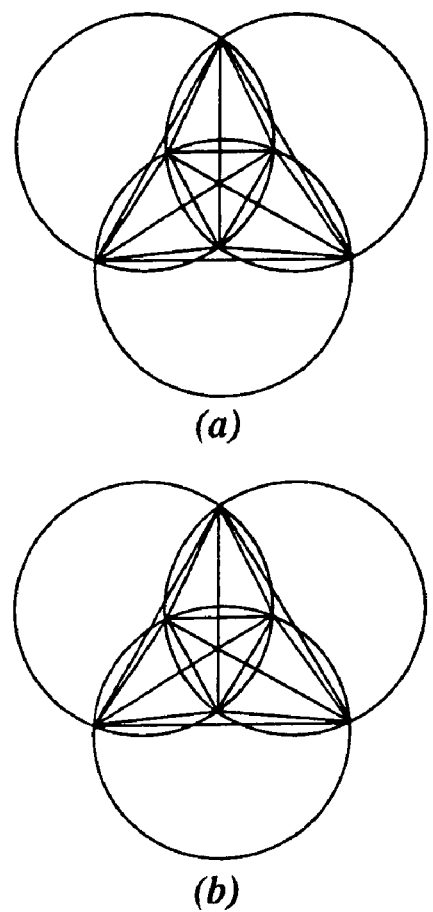
FIG. 52 illustrates a comparison of curved shapes for final match check; (a) not a match (b) match.

The multiple instances of symmetry in the distinct shape (equilateral triangle) place the shield shape in the most constrained level of our sample hierarchy which dictates that translation, rotation, and uniform scaling be used for shape matching. Matches of the distinct shape are found in two places with three orientations each (FIG. 51) in the target. As the final check for shape matching, the curved segments that share common distinct points with the straight lines of the distinct shape are compared to the corresponding curved lines of the target shape. FIG. 52 shows an overlay of the shield shape on the potential match in the target. It is apparent that the curves of the shield are not a subset of the curves of the target shape in FIG. 52*a* while they are a match in FIG. 522.

Determining whether the curves of the shield are collinear with curves of the target can be done in several ways. The curved line segments in question in the target shape can be re-parameterized, breaking the curve into segments equal to those in the shield. The control polygons of the two curved line segments can then be compared for equivalence. Another possibility is comparing the location and existence of curve features (radius of curvature, inflection points) or checking for a point on line match at a few locations on the line segment.

Figure 53:
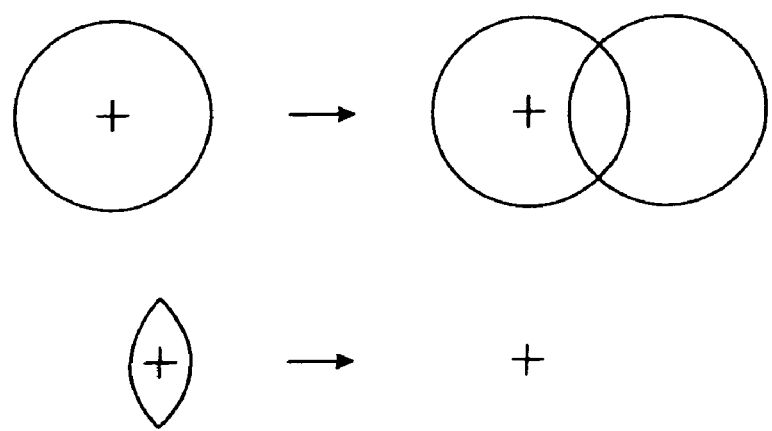
FIG. 53 illustrates a two rule grammar for creating headlight designs.

Shape grammars can benefit from both automated generation and interaction with a human user. Automation provides the means for enumerating possible designs, which act as a springboard for some creative exercises. A grammar for generating headlight designs was created. The headlight grammar began as a simple two rule grammar (FIG. 53) implemented with the curved shape interpreter.

Figure 54:
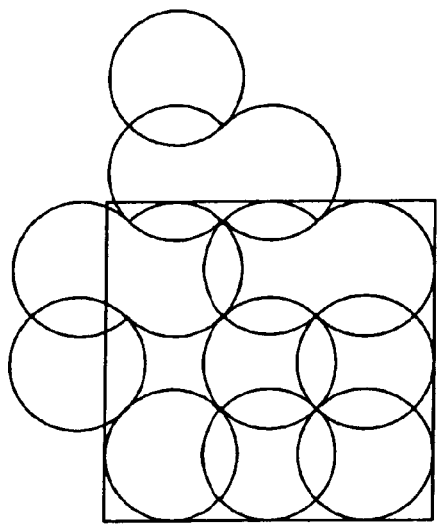
FIG. 54 illustrates a shape created with the grammar in FIG. 53. The selected area is the starting point for the next step.
Figure 55:
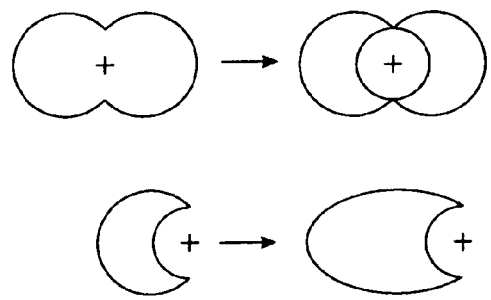
FIG. 55 illustrates two additional rules for generating headlights.
Figure 56:
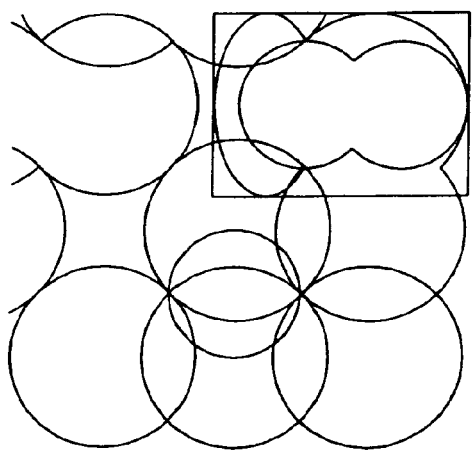
FIG. 56 illustrates a shape produced from all four rules, with the selected area being refined by the user.
Figure 57:
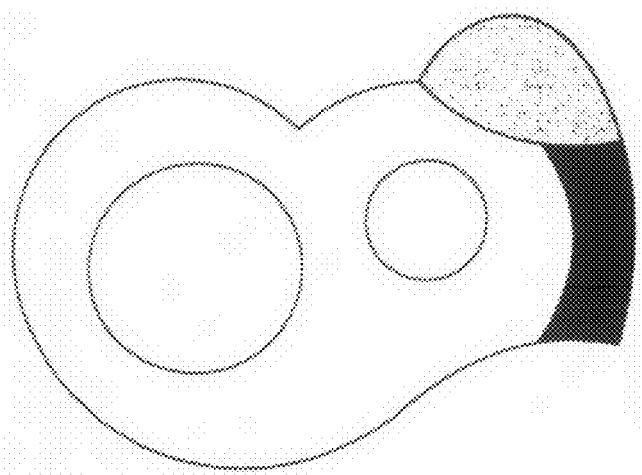
FIG. 57 is an alternative headlight design with turn signals and parking lights.
Figure 58:
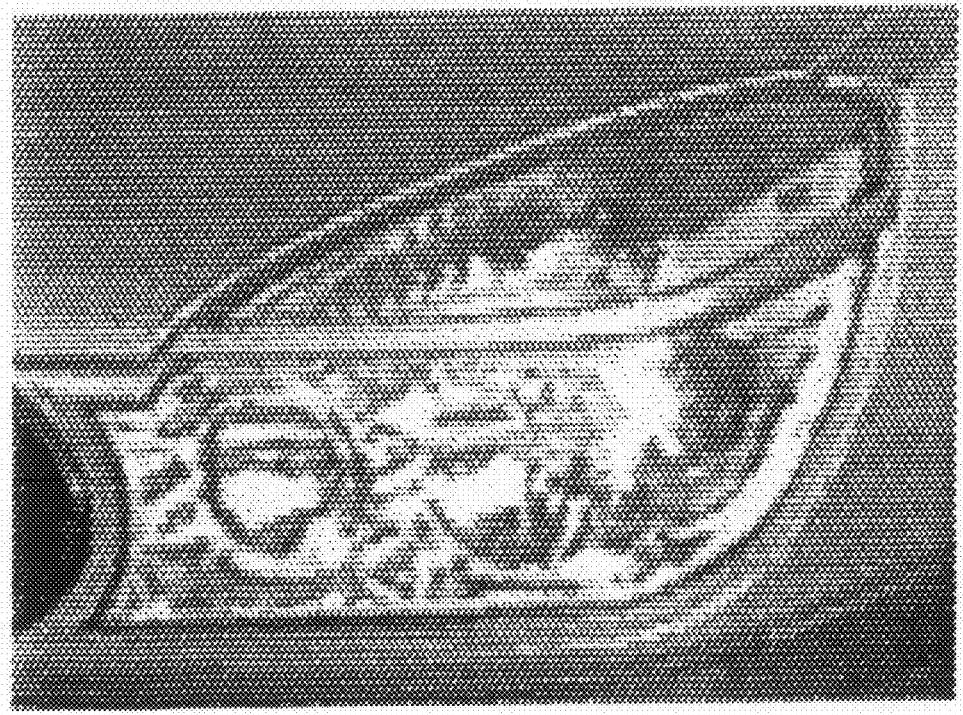
FIG. 58 illustrates the 2002 Buick Rendezvous lights.

If the grammar were permitted to run randomly, a field of headlight designs (FIG. 54) would be produced. The user could then observe and select interesting patterns and emerging shapes and use these shapes to create new rules (FIG. 55). A portion of the field can be selected as a starting point for the augmented grammar. Generation continues, producing new shapes shown in FIG. 56. A section is then chosen from the design and is manually trimmed and refined (FIG. 57). The new headlight design is presented as an alternative to the headlights on the existing 2002 Buick Rendezvous (FIG. 58).

While the present invention has been described in the environment of a shape grammar, it will be apparent to those of ordinary skill in the art that the shape recognition method and apparatus disclosed herein may by employed in environments other than shape grammars. Those of ordinary skill in the art will also recognize that many modifications and variations of the present invention may be implemented. The foregoing description and the following claims are intended to cover all such modifications and variations.

What is claimed is:

1. A shape interpreter, comprising:
 a shape decomposition module implemented as code stored on a computer readable medium for decomposing a shape into a group of subshapes, said subshapes having equivalent straight lines for curved lines; and
 a shape recognition module implemented as code stored on a computer readable medium in communication with the shape decomposition module, wherein the shape decomposition module decomposes one side of a production system rule into at least one subshape belonging to one of a plurality of subshape groups.

2. The shape interpreter of claim 1, wherein the subshape groups have a hierarchical order of decreasing constraints.

3. The shape interpreter of claim 1, wherein the shape decomposition module decomposes a two-dimensional shape of one side of a rule into one or more subshapes.

4. The shape interpreter of claim 1, wherein the shape decomposition module decomposes a three-dimensional shape of one side of a rule into one or more subshapes.

5. The shape interpreter of claim 1, wherein the shape decomposition module decomposes a one-dimensional shape of one side of a rule into one or more subshapes.

6. The shape interpreter of claim 1, wherein the shape recognition module searches a target shape for a parametric transformation of the subshape.

7. The shape interpreter of claim 1, wherein the shape recognition module recognizes a parametric transformation of a shape on one side of a rule in a target shape by searching the target shape for a parametric transformation of the subshape.

8. The shape interpreter of claim 7, wherein the shape recognition module recognizes a parametric transformation of a shape on one side of a rule in a target shape by progressively searching for a parametric transformation of a subshape belonging to each of the subshape groups that is not null and subtracting the parametric transformation from the target shape.

9. The shape interpreter of claim 8 wherein the parametric transformations are based on the original curved line.

10. A system, comprising:
 a shape interpreter for recognizing a first shape in a target shape, said interpreter comprising a shape decomposition module implemented as code stored on a computer readable medium for decomposing said first shape into a group of subshapes, said subshapes having equivalent straight lines for curved lines, said interpreter further comprising a shape recognition module implemented as code stored on a computer readable medium in communication with the shape decomposition module; and
 a rule application module implemented as code stored on a computer readable medium in communication with said shape interpreter, wherein the first shape is one side of a production system rule, said shape decomposition module for decomposing said first shape into at least one subshape belonging to one of a plurality of subshape groups.

11. The system of claim 10, wherein the subshape groups have a hierarchical order of decreasing constraints.

12. The system of claim 10, wherein the shape recognition module recognizes a parametric transformation of the shape on one side of said production system rule in said target shape by searching said target shape for a parametric transformation of the subshape.

13. The system of claim 12, wherein the shape recognition module recognizes a parametric transformation of the shape on one side of the production system rule in said target shape by progressively searching for a parametric transformation of a subshape belonging to each of the subshape groups that is not null and subtracting the parametric transformation of the subshape from the target shape.

14. The system of claim 12, wherein the rule application module applies the production system rule by subtracting the parametric transformation of the shape on one side of the rule from said target shape and substituting therefore a transformation of a shape on the other side of the rule.

15. The system of claim 12, further comprising a rule selection module implemented as code stored on a computer readable medium in communication with the shape interpreter.

16. A shape interpreter, comprising:
means implemented as code stored on a computer readable medium for decomposing one side of a production system rule into at least one subshape belonging to one of a plurality of subshape groups, said subshapes having equivalent straight lines for curved lines; and
means implemented as code stored on a computer readable medium for recognizing a parametric transformation of one side of a production system rule in a target shape by progressively searching for a parametric transformation of a subshape belonging to each of the subshape groups that is not null and subtracting the parametric transformation of the subshape from the target shape, said means for recognizing including means implemented as code stored on a computer readable medium for adding a parametric transformation of a first subshape found in the target shape belonging to a first of the subshape groups and a parametric transformation of a second subshape found in a second target shape belonging to a second of the subshape groups, wherein the second target shape corresponds to the transformed first subshape subtracted from the target shape.

17. A method of recognizing parametric transformations of one side of a production system rule in a target shape, comprising:
using a computer to perform the steps of:
decomposing one side the production system rule into at least one subshape belonging to one of a plurality of subshape groups, said subshapes having equivalent straight lines for curved lines;
progressively searching for a parametric transformation of a subshape belonging to each of the subshape groups that is not null and subtracting the parametric transformation from a target shape; and
adding a parametric transformation of a first subshape found in the target shape belonging to a first of the subshape groups and a parametric transformation of a second subshape found in a second target shape belonging to a second of the subshape groups, wherein the second target shape corresponds to the transformed first subshape subtracted from the target shape.

18. A method of recognizing parametric transformations of one side a production system rule in a target shape, comprising:
using a computer to perform the steps of:
searching the target shape for a parametric transformation of a first subshape, from a group of subshapes derived from one side of a production system rule, said subshapes having equivalent straight lines for curved lines;
generating a second target shape corresponding to the parametric transformation of the first subshape, found in the target shape, subtracted from the target shape;
searching the second target shape for a parametric transformation of a second subshape from said group of subshapes; and
adding the parametric transformation of the first subshape found in the target shape to a parametric transformation of the second subshape found in the second target shape.

19. The method of claim 18, further comprising:
generating a third target shape corresponding to the parametric transformation of the second subshape subtracted from the second target shape;
searching the third target shape for a parametric transformation of a third subshape from said group of subshapes; and
adding the parametric transformation of the third subshape found in the third target shape to a sum of the parametric transformation of the first subshape found in the target shape and the parametric transformation of the second subshape found in the second target shape.

20. The method of claim 18, further comprising:
subtracting a sum of the parametric transformation of the first subshape found in the target shape and the parametric transformation of the second subshape found in the second target shape from the target shape; and
adding a corresponding transformation of the other side of the production system rule to the target shape.

21. A method of recognizing a first shape in a target shape, comprising:
using a computer to perform the steps of:
decomposing the first shape into at least one subshape belonging to one of a plurality of subshape groups using a production system rule, said subshapes having equivalent straight lines for curved lines; and
searching the target shape for a parametric transformation of the subshape, wherein searching the target shape includes progressively searching the target shape for a parametric transformation of a subshape belonging to each of the subshape groups that are not null and subtracting the parametric transformation of the subshape from the target shape.

* * * * *

UNITED STATES PATENT AND TRADEMARK OFFICE
CERTIFICATE OF CORRECTION

| | | |
|---|---|---|
| PATENT NO. | : 7,502,511 B2 | Page 1 of 1 |
| APPLICATION NO. | : 11/897180 | |
| DATED | : March 10, 2009 | |
| INVENTOR(S) | : Jay McCormack and Jonathan Cagan | |

It is certified that error appears in the above-identified patent and that said Letters Patent is hereby corrected as shown below:

Column 3, Line 23, after "according" insert -- to --.

Column 3, Line 52, delete "co" and substitute therefore -- $c_0$ --.

Column 9, Line 16, delete "$C_i$" and substitute therefore -- $C_1$ --.

Column 9, Line 65, delete "$s_i$" and substitute therefore -- $S_i$ --.

Column 11, Line 30, delete "left hand" and substitute therefore -- left-hand --.

Column 11, Line 58, delete "been" and substitute therefore -- be --.

Column 13, Line 51, before "FIG. 31" insert -- In --.

Column 13, Line 59, after "$a_1$" delete -- , --.

Column 16, Line 14, delete "necessary" and substitute therefore -- necessarily --.

Column 17, Line 45, delete "FIG. 522" and substitute therefore -- FIG. 52b --.

Signed and Sealed this

Twelfth Day of May, 2009

JOHN DOLL
*Acting Director of the United States Patent and Trademark Office*